(12) United States Patent
Nakamura et al.

(10) Patent No.: US 6,759,186 B2
(45) Date of Patent: Jul. 6, 2004

(54) SILVER HALIDE PHOTOGRAPHIC MATERIAL

(75) Inventors: Tetsuo Nakamura, Minami Ashigara (JP); Kimiyasu Morimura, Minami Ashigara (JP); Takanori Hioki, Minami Ashigara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 101 days.

(21) Appl. No.: 10/058,285

(22) Filed: Jan. 30, 2002

(65) Prior Publication Data
US 2002/0168599 A1 Nov. 14, 2002

(30) Foreign Application Priority Data

Jan. 30, 2001 (JP) ..................... P.2001-021719

(51) Int. Cl.$^7$ .............................. G03C 1/005
(52) U.S. Cl. ................. 430/574; 430/570; 430/581; 430/582; 430/583; 430/584; 430/600; 430/603
(58) Field of Search ................. 430/574, 570, 430/581, 582, 583, 584, 600, 603, 599

(56) References Cited

U.S. PATENT DOCUMENTS

| 4,387,155 A | 6/1983 | Hill et al. |
| 5,135,845 A | 8/1992 | MacIntyre et al. |
| 5,254,455 A | 10/1993 | Hinz et al. |
| 5,290,676 A | 3/1994 | Nagaoka et al. |
| 6,365,335 B1 * | 4/2002 | Hioki et al. ............. 430/585 |
| 6,458,524 B1 * | 10/2002 | Nakamura et al. ......... 430/584 |

\* cited by examiner

*Primary Examiner*—Geraldine Letscher
(74) *Attorney, Agent, or Firm*—Birch, Stewart, Kolasch & Birch, LLP

(57) ABSTRACT

A silver halide photographic material is disclosed, comprising at least one silver halide emulsion layer provided on a support, the emulsion layer comprising a silver halide emulsion containing at least two sensitizing dyes represented by the following general formula (I):

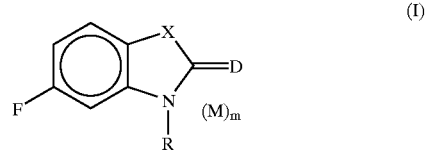

wherein X represents an oxygen atom, sulfur atom, selenium atom or NR'; R and R' each represent a substituted or unsubstituted alkyl, aryl or heterocyclic group; D represents a group required to form a methine dye; M represents a counter ion; and m represents a number of not smaller than 0 required to neutralize the electric charge in the molecule.

10 Claims, No Drawings

SILVER HALIDE PHOTOGRAPHIC MATERIAL

FIELD OF THE INVENTION

The present invention relates to a silver halide photographic material. More particularly, the present invention relates to a silver halide photographic material which exhibits a high sensitivity and leaves little undesired color unextinguished (i.e., little residual color) even after rapid process.

BACKGROUND OF THE INVENTION

A great effort has heretofore been made to enhance the sensitivity of silver halide photographic light-sensitive materials and allow the silver halide photographic materials to leave less undesired color unextinguished (i.e., less residual color) after processing. In addition to photographic requirements for higher sensitivity and image quality, there has been a growing demand for the enhancement of photographic processing speed, reduction of the amount of waste liquid under the necessity of meeting environmental protection, etc. It has thus been desired to develop a technique for spectrally sensitizing silver halide grains to a high degree without having adverse effects such as fog and color remaining (i.e., residual color).

It has been known that sensitizing dyes for use in spectral sensitization have a great effect on the properties of silver halide photographic materials. Even a small structural difference between sensitizing dyes has a great effect on photographic properties such as sensitivity, fog, storage stability and color remaining after processing. Further, the combined use of two or more sensitizing dyes, too, have a great effect on photographic properties. It is difficult to predict these effects. Many researchers have heretofore synthesized a large number of sensitizing dyes. Many researchers have also made studies of combined use of a large number of sensitizing dyes and efforts to examine the photographic properties. However, it is the status quo that the photographic properties cannot still be predicted.

A tabular silver halide grain has a great surface area per volume (specific surface area) and thus is advantageous for spectral sensitization because it can adsorb a large amount of a sensitizing dye. Such a tabular silver halide grain is also useful in the improvement of sensitivity/graininess. However, it accordingly causes more dye color remaining (i.e., dye-residual color). This color remaining problem is more severe than caused by regular grains.

On the other hand, it has been desired to reduce the photographic processing time. However, when the processing time is reduced, the emulsion leaves more sensitizing dyes unprocessed, causing more severe color remaining problem. In some photofinishing laboratories, photographic light-sensitive materials are processed with processing solutions having varied formulations or rinsed at low temperatures, occasionally causing severe color remaining. It has thus been keenly desired to develop a technique for lessening color remaining of sensitizing dyes.

The occurrence of color remaining of sensitizing dyes depends greatly on the hydrophobicity of the dyes. In other words, the more hydrophilic is a dye, the less occurs color remaining. On the other hand, however, the dye exhibits a reduced adsorptivity to the surface of silver halide grains, having adverse effects on photographic properties such as sensitivity drop and deterioration of preservability. Thus, it is not desired to render a dye excessively hydrophilic. In short, in order to lessen color remaining while keeping desired photographic properties, it is necessary to select the hydrophilicity or hydrophobicity of a dye appropriately. The inventors disclose in Japanese Patent Application (Laid-Pen) No. 2001-75224 that the optimum selection of various substituents on sensitizing dyes makes it possible to attain both desired photographic properties and minimization of color remaining.

However, the recent trend is that factors such as rise of aspect ratio of tabular silver halide grains and further rise of the added amount of sensitizing dyes cause another problem. In other words, it has been made obvious that when a large amount of a sensitizing dye is added to a tabular grain, the sensitizing dye adsorbed at a high percent coverage causes gelatin to lose its function as a protective colloid. In particular, tabular grains having a high aspect ratio are subject to contact of main planes and coalescence of grains and hence agglomeration, causing side effects such as increased occurrence of fog or sensitivity drop during aging of emulsion in the form of solution and deterioration of graininess. As a countermeasure against these difficulties there has been known a method as disclosed in Japanese Patent Application (Laid-Open) No. 1994-332091 involving the addition of a fine emulsion of substantially insoluble silver bromoiodide grains during or after the chemical sensitization of a silver halide emulsion. However, this approach cannot be applied to all emulsions. It has been desired to provide a substitute for this approach.

SUMMARY OF THE INVENTION

An object of the present invention is to provide a silver halide photographic material which exhibits a high sensitivity and leaves little undesired color unextinguished (i.e., little residual color) even after rapid processing or processing under severe conditions.

As a result of extensive studies, the object of the present invention was accomplished by the following aspects (1) to (11) of the present invention:

(1) A silver halide photographic material comprising at least one silver halide emulsion layer provided on a support, the emulsion layer comprising a silver halide emulsion containing at least two sensitizing dyes represented by the following general formula (I):

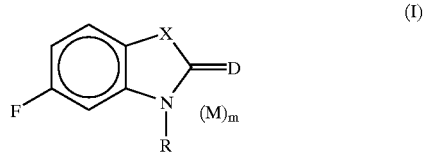

wherein X represents an oxygen atom, sulfur atom, selenium atom or NR'; R and R' each represent a substituted or unsubstituted alkyl, aryl or heterocyclic group; D represents a group required to form a methine dye; M represents a counter ion; and m represents a number of not smaller than 0 required to neutralize the electric charge in the molecule.

(2) The silver halide photographic material according to the above item (1), wherein the two sensitizing dyes each are a cyanine dye.

(3) The silver halide photographic material according to the above item (1) or (2), wherein the two sensitizing dyes each are represented by the following general formula (II):

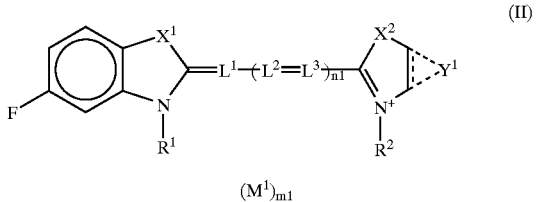

(II)

wherein $X^1$ and $X^2$ each represent an oxygen atom, sulfur atom, selenium atom or $NR^3$; $R^1$, $R^2$ and $R^3$ each represent a substituted or unsubstituted alkyl, aryl or heterocyclic group; $Y^1$ represents a condensed ring which may have substituents; $L^1$, $L^2$ and $L^3$ each represent a methine group; $n^1$ represents 0, 1, 2 or 3, with the proviso that when $n^1$ is 2 or 3, the plurality of $L^2$'s and $L^3$'s each may be the same or different; $M^1$ represents a counter ion; and $m^1$ represents a number of not smaller than 0 required to neutralize the electric charge in the molecule.

(4) The silver halide photographic material according to the above item (3), wherein $n^1$ in the two sensitizing dyes are the same.

(5) The silver halide photographic material according to the above item (3), wherein $X^1$ and $X^2$ each are selected from the group consisting of oxygen atom and sulfur atom.

(6) The silver halide photographic material according to any one of the above items (1) to (5), wherein the two sensitizing dyes each have at least two dissociative groups.

(7) The silver halide photographic material according to the above item (6), wherein the sensitizing dyes each have at least one —$SO_3H$ group and at least one dissociative group other than —$SO_3H$.

(8) The silver halide photographic material according to the above item (7), wherein the dissociative group other than —$SO_3H$ is selected from the group consisting of —COOH, —$CONHSO_2Z$, —$SO_2NHCOZ$, —$SO_2NHSO_2Z$ and —CONHCOZ in which Z represents an alkyl group, aryl group, heterocyclic group, alkoxy group, aryloxy group, heterocyclyloxy group or amino group.

(9) A silver halide photographic material comprising at least one silver halide emulsion layer provided on a support, the emulsion layer comprising a silver halide emulsion containing at least one cyanine dye represented by the following general formula (III):

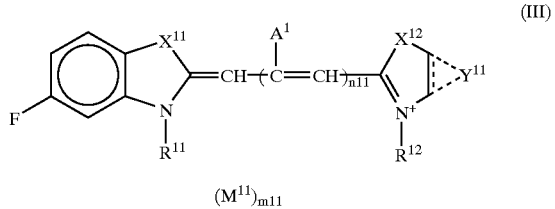

(III)

wherein $R^{11}$ and $R^{12}$ each represent a substituted or unsubstituted alkyl group, with the proviso that at least one of $R^{11}$ and $R^{12}$ is substituted by a —COOH group; $X^{11}$ and $X^{12}$ each represent an oxygen atom or sulfur atom; $Y^{11}$ represents a condensed naphthalene ring which may have substituents; $A^1$ represents a hydrogen atom or unsubstituted alkyl group; $n^{11}$ represents 0 or 1; $M^{11}$ represents a counter ion; and $m^{11}$ represents a number of not smaller than 0 required to neutralize the electric charge in the molecule.

(10) The silver halide photographic material according to any one of the above items (1) to (9), wherein the silver halide emulsion in at least one emulsion layer comprises at least one sensitizing dye represented by the following general formula (III) and at least one sensitizing dye represented by the following general formula (IV):

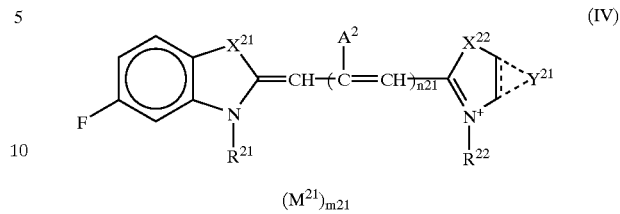

(IV)

wherein $R^{21}$ and $R^{22}$ each represent a substituted or unsubstituted alkyl group, with the proviso that at least one of $R^{21}$ and $R^{22}$ is substituted by a dissociative group other than —$SO_3H$ group; $X^{21}$ and $X^{22}$ each represent an oxygen atom or sulfur atom; $Y^{21}$ represents a condensed benzene ring which may have substituents; $A^2$ represents a hydrogen atom or unsubstituted alkyl group; $n^{21}$ represents 0 or 1; $M^{21}$ represents a counter ion; and $m^{21}$ represents a number of not smaller than 0 required to neutralize the electric charge in the molecule.

(11) The silver halide photographic material according to any one of the above items (1) to (10), wherein the emulsion comprising sensitizing dyes represented by the general formula (I) comprises tabular grains having an aspect ratio of not smaller than 2 incorporated therein in a proportion of not smaller than 50% based on the total projected area of the silver halide grains incorporated therein.

(12) The silver halide photographic material according to any one of the above items (1) to (11), wherein the emulsion comprising sensitizing dyes represented by the general formula (I) is subjected to chemical sensitization with a selenium sensitizer.

DETAILED DESCRIPTION OF THE INVENTION

The sensitizing dyes to be used in the present invention will be further described hereinafter.

In the present invention, when a specific moiety is referred to as "group", it means that the moiety may not be substituted itself or may be substituted by one or more (maximum allowable number of) substituents. For example, the term "alkyl group" as used herein is meant to indicate a substituted or unsubstituted alkyl group. The substituents employable in the compounds of the present invention include any substituents regardless of whether or not they are substituted.

The substituent, if represented by V, is not specifically limited. Examples of the substituent represented by V include halogen atom, alkyl group such as alkyl group (e.g., cycloalkyl group, bicycloalkyl group), alkenyl group (e.g., cycloalkenyl group, bicycloalkenyl group, tricycloalkenyl group) and alkinyl group, aryl group, heterocyclic group, cyano group, hydroxyl group, nitro group, carboxyl group, alkoxy group, aryloxy group, silyloxy group, heterocyclic oxy group, acyloxy group, carbamoyloxy group, alkoxycarbonyloxy group, aryloxycarbonyloxy group, amino group (including anilino group), ammonio group, acylamino group, aminocarbonylamino group, alkoxycarbonylamino group, aryloxycarbonylamino group, sulfamonylamino group, alkylsulfonylamino group, arylsulfonylamino group, mercapto group, alkylthio group, arylthio group, heterocyclic thio group, sulfamoyl group, sulfo group, alkylsulfinyl group, arylsulfinyl group, alkylsulfonyl group, arylsulfonyl group, acyl group, alkoxycarbonyl group, aryloxycarbonyl group, carbamoyl group, arylazo group, heterocyclic azo group, imido group, phosphino group, phosphinyl group, phosphinyloxy group, phosphinylamino group, phospho group, silyl group, hydrazino group, ureido group, and other known substituents.

More specifically, V represents a halogen atom (e.g., fluorine, chlorine, bromine, iodine), alkyl group [straight-chain, branched or cyclic substituted or unsubstituted alkyl group, including alkyl group (e.g., $C_1$–$C_{30}$ alkyl group (i.e., alkyl group having 1 to 30 carbon atoms) such as methyl, ethyl, n-propyl, isopropyl, t-butyl, n-octyl, eicosyl, 2-chloroethyl, 2-cyanoethyl, 2-ethylhexyl), cycloalkyl group (preferably $C_3$–$C_{30}$ substituted or unsubstituted cycloalkyl group such as cyclohexyl, cyclopentyl and 4-n-dodecylcyclohexyl), bicycloalkyl group (preferably $C_5$–$C_{30}$ substituted or unsubstituted bicycloalkyl group such as bicyclo[1.2.2]heptane-2-il and bicyclo[2.2.]octane-3-il), tricyclo structure having many cyclic structures, etc. The alkyl groups in the substituents described later (e.g., alkyl group in alkylthio group) include the following alkenyl group, cycloalkenyl group, bicycloalkenyl group, alkinyl group, etc. in addition to the foregoing concept of alkyl group], alkenyl group [straight-chain, branched or cyclic substituted or unsubstituted alkenyl group, including alkenyl group (preferably $C_2$–$C_{30}$ substituted or unsubstituted alkenyl group such as vinyl, allyl, prenyl, gelanyl, oleyl), cycloalkenyl group (preferably $C_3$–$C_{30}$ substituted or unsubstituted cycloalkenyl group such as 2-cyclopentene-1-il and 2-cyclohexene-1-il), bicycloalkenyl group (substituted or unsubstituted bicycloalkenyl group, preferably $C_5$–$C_{30}$ substituted or unsubstituted bicycloalkenyl group such as bicyclo[2.2.1]hepto-2-ene-1-il and bicyclo[2.2.2]octo-2-ene-4-il)], alkinyl group (preferably $C_2$–$C_{30}$ substituted or unsubstituted alkinyl group such as ethinyl, propargyl and trimethylsilyl ethinyl), aryl group (preferably $C_6$–$C_{30}$ substituted or unsubstituted aryl group such as phenyl, p-tollyl, naphthyl, m-chlorophenyl and o-hexadecanoylaminophenyl), heterocyclic group (preferably monovalent group obtained by removing one hydrogen atom from a 5- or 6-membered substituted or unsubstituted aromatic or non-aromatic heterocyclic compound, more preferably $C_3$–$C_{30}$ 5- or 6-membered aromatic heterocyclic group such as 2-furyl, 2-chenyl, 2-pyrimidinyl and 2-benzothiazolyl or cationic heterocyclic group such as 1-methyl-2-pyridinio and 1-methyl-2-quinolinio), cyano group, hydroxyl group, nitro group, carboxyl group, alkoxy group (preferably $C_1$–$C_{30}$ substituted or unsubstituted alkoxy group such as methoxy, ethoxy, isopropoxy, t-butoxy, n-octyloxy and2-methoxyethoxy), aryloxy group (preferably $C_6$–$C_{30}$ substituted or unsubstituted aryloxy group such as phenoxy, 2-methylphenoxy, 4-t-butylphenoxy, 3-nitrophenoxy and 2-tetradecanoylaminophenoxy), silyloxy group (preferably $C_3$–$C_{20}$ silyloxy group such as trimethylsilyloxy and t-butyldimethylsilyloxy), heterocyclicoxy group (preferably $C_2$–$C_{30}$ substituted or unsubstituted heterocycicoxy group such as 1-phenyltetrazol-5-oxy or 2-tetrahydropyranyl), acyloxy group (preferably formyloxy group, $C_2$–$C_{30}$ substituted or unsubstituted alkylcarbonyloxy group or $C_6$–$C_{30}$ substituted or unsubstituted arylcarbonyloxy group such as formyloxy, acetyloxy, pivaloyloxy, stearoyloxy, benzoyloxy, p-methoxyphenylcarbonyloxy), carbamoyloxy group (preferably $C_1$–$C_{30}$ substituted or unsubstituted carbamoyloxy group such as N,N-dimethylcarbamoyloxy, N,N-diethylcarbamoyloxy, morpholinocarbonyloxy, N,N-di-n-octylaminocarbonyloxy, N-n-octylcarbamoyloxy), alkoxycarbonyloxy group (preferably $C_2$–$C_{30}$ substituted or unsubstituted alkoxycarbonyloxy group such as methoxycarbonyloxy, ethoxycarbonyloxy, t-butoxycarbonyloxy and n-octylcarbonyloxy), aryloxycarbonyloxy group (preferably $C_7$–$C_{30}$ substituted or unsubstituted aryloxycarbonyloxy group such as phenoxycarbonyloxy, p-methoxyphenoxycarbonyloxy and p-n-hexadecyloxyphenoxycarbonyloxy), amino group (preferably amino group, $C_1$–$C_{30}$ substituted or unsubstituted alkylamino group or $C_6$–$C_{30}$ substituted or unsubstituted anilino group such as amino, methylamino, dimethylamino, anilino, N-methylanilino and diphenylamino), ammonio group (preferably ammonio group, and ammonio group substituted by $C_1$–$C_{30}$ substituted or unsubstituted alkyl group, aryl group or heterocyclic group such as trimethylammonio, triethylammonio and diphenylmethylammonio), acylamino group (preferably formylamino group, $C_1$–$C_{30}$ substituted or unsubstituted alkylcarbonylamino group or $C_6$–$C_{30}$ substituted or unsubstituted arylcarbonylamino group such as formylamino, acetylamino, pivaloylamino, lauroylamino, benzoylamino and 3,4,5-tri-n-octyloxyphenylcarbonylamino), aminocarbonyl amino group (preferably $C_1$–$C_{30}$ substituted or unsubstituted aminocarbonylamino group such as carbamoylamino, N,N-dimethylaminocarbonylamino, N,N-diethylaminocarbonylamino and morpholinocarbonylamino), alkoxycarbonylamino group (preferably $C_2$–$C_{30}$ substituted or unsubstituted alkoxycarbonylamino group such as methoxycarbonylamino, ethoxycarbonylamino, t-butoxycarbonylamino, n-octadecyloxycarbonylamino and N-methylmethoxycarbonylamino), aryloxycarbonylamino group (preferably $C_7$–$C_{30}$ substituted or unsubstituted aryloxycarbonylamino group such as phenoxycarbonylamino, p-chlorophenoxycarbonylamino and m-(n-octyloxy) phenoxycarbonylamino), sulfamoylamino group (preferably $C_0$–$C_{30}$ substituted or unsubstituted sulfamoylamino group such as sulfamoylamino, N,N-dimethylaminosulfonylamino and N-n-octylaminosulfonylamino), alkylsulfonylamino group or arylsulfonylamino group (preferably $C_1$–$C_{30}$ substituted or unsubstituted alkylsulfonylamino group or $C_6$–$C_{30}$ substituted or unsubstituted arylsulfonylamino group such as methylsulfonylamino, butylsulfonylamino, phenylsulfonylamino, 2,3,5-trichlorophenylsulfonylamino and p-methylphenylsulfonylamino), mercapto group, alkylthio group (preferably $C_1$–$C_{30}$ substituted or unsubstituted alkylthio group such as methylthio, ethylthio and n-hexadecylthio), arylthio group (preferably $C_6$–$C_{30}$ substituted or unsubstituted arylthio group such as phenylthio, p-chlorophenylthio and m-methoxyphenylthio), heterocyclic thio group (preferably $C_2$–$C_{30}$ substituted or unsubstituted heterocyclic thio group such as 2-benzothiazolylthio and 1-phenyltetrazole-5-ilthio), sulfamoyl group (preferably $C_0$–$C_{30}$ substituted or unsubstituted sulfamoyl group such as N-ethylsulfamoyl, N-(3-dodecyloxypropyl)sulfamoyl, N,N-dimethylsulfamoyl, N-acetylsulfamoyl, N-benzoylsulfamoyl and N- (N'-phenylcarbamoyl) sulfamoyl), sulfo group, alkylsulfinyl group or arylsulfinyl group (preferably $C_1$–$C_{30}$ substituted or unsubstituted alkylsulfinyl group or $C_6$–$C_{30}$ substituted or unsubstituted arylsulfinyl group such as methylsulfinyl, ethylsulfinyl, phenylsulfinyl and p-methylphenylsulfinyl), alkylsulfonyl group or arylsulfinyl group (preferably $C_1$–$C_{30}$ substituted or unsubstituted alkylsulfonyl group or $C_6$–$C_{30}$ substituted or unsubstituted arylsulfonyl group such as methylsulfonyl, ethylsulfonyl, phenylsulfonyl, p-methylphenylsulfonyl), acyl group (preferably formyl group, $C_2$–$C_{30}$ substituted or unsubstituted alkylcarbonyl group, $C_7$–$C_{30}$ substituted or unsubstituted arylcarbonyl group or $C_4$–$C_{30}$ substituted or unsubstituted heterocyclic carbonyl group having carbonyl groups bonded to each other via carbon atom such as acetyl, pivaloyl, 2-chloroacetyl, stearoyl, benzoyl, p-n-octyloxyphenylcarbonyl, 2-pyridylcarbonyl and 2-furylcarbonyl), aryloxycarbonyl group (preferably $C_7$–$C_{30}$ substituted or unsubstituted aryloxycarbonyl group such as phenoxycarbonyl, o-chlorophenoxycarbonyl, m-nitrophenoxycarbonyl and p-t-butylphenoxycarbonyl), alkoxycarbonyl group (preferably $C_2$–$C_{30}$ substituted or unsubstituted alkoxycarbonyl group such as methoxycarbonyl, ethoxycarbonyl, t-butoxycarbonyl and n-octadecyloxycarbonyl), carbamoyl group (preferably $C_1$–$C_{30}$ substituted or unsubstituted carbamoyl group such as carbamoyl, N-methylcarbamoyl, N,N-dimethylcarbamoyl, N,N-di-n-octylcarbamoyl and N-(methylsulfonyl) carbamoyl), arylazo group or heterocyclic azo group (preferably $C_6$–$C_{30}$ substituted or unsubstituted arylazo group or $C_3$–$C_{30}$ substituted or unsubstituted heterocyclic azo group such as phenylazo, p-chlorophenylazo and 5-ethylthio-1,3,4-thiadiazole-2-ilazo), imido group (preferably N-succinimido, N-phthalimido), phosphino group (preferably $C_2$–$C_{30}$ substituted or unsubstituted phosphino group such as dimethylphosphino, diphenylphosphino and methylphenoxyphosphino), phosphinyl group (preferably $C_2$–$C_{30}$ substituted or unsubstituted phosphinyl group such as phosphinyl, dioctyloxyphosphinyl and diethoxyphosphinyl), phosphinyloxy group (preferably $C_2$–$C_{30}$ substituted or unsubstituted phosphinyloxy group such as diphenoxyphosphinyloxy and dioctyloxyphosphinyloxy), phosphinylamino group (preferably $C_2$–$C_{30}$ substituted or unsubstituted phosphinylamino group such as dimethoxyphosphinylamino and dimethylaminophosphinylamino), phospho group, silyl group (preferably $C_3$–$C_{30}$ substituted or unsubstituted silyl group such as trimethylsilyl, t-butyldimethylsilyl and phenyldimethylsilyl), hydrazino group (preferably $C_0$–$C_{30}$ substituted or unsubstituted hydrazino group such as trimethylhydrazino) or ureido group (preferably $C_0$–$C_{30}$ substituted or unsubstituted ureido group such as N,N-dimethylureido).

Two V's may be connected to each other to have a structure having rings condensed to each other (aromatic or non-aromatic hydrocarbon ring or heterocycle. These rings may be further combined to form a polycyclic condensed ring. Examples of the ring include benzene ring, naphthalene ring, anthracene ring, phenanthrene ring, fluorene ring, triphenylene ring, naphthacene ring, biphenyl ring, pyrrole ring, furan ring, thiphene ring, imidazole ring, oxazole ring, thiazole ring, pyridine ring, pyrazine ring, pyrimidine ring, pyridazine ring, indolizine ring, indole ring, benzofuran ring, benzothiophene ring, isobenzofuran ring, quinolizine ring, quinoline ring, isoquinoline ring, phthalazine ring, naphthyridine ring, quinoxaline ring, quinoxazoline ring, carbazole ring, phenanthridine ring, acridine ring, phenanthroline ring, thianthrene ring, chromene ring, xanthene ring, phenoxathiin ring, phenothiazine ring, and phenazine ring).

Among the foregoing substituents V, those having a hydrogen atom may be freed of hydrogen atom, and then substituted by the foregoing substituents. Examples of such a composite substituent include acylsulfamoyl group, alkylsulfonylacarbamoyl group, and arylsulfonylcarbamoyl group. Examples of these composite substituents include methylsulfonylcarbamoyl, p-methylphenylsulfonylcarbamoyl, acetylsulfamoyl, and benzoylsulfamoyl.

The sensitizing dye to be incorporated in the silver halide photographic material of the present invention is represented by the general formula (I). One emulsion in at least one emulsion layer contains two different dyes. The sensitizing dye of the general formula (I) will be further described hereinafter.

In the general formula (I), X represents an oxygen atom, sulfur atom, selenium atom or NR'. R' represents a substituted or unsubstituted alkyl, aryl or heterocyclic group. X preferably represents an oxygen atom or sulfur atom.

R and R' each represent a substituted or unsubstituted alkyl, aryl or heterocyclic group.

The alkyl group represented by R or R' is a $C_1$–$C_{18}$, preferably $C_1$–$C_7$, particularly $C_1$–$C_4$ unsubstituted alkyl group (e.g., methyl, ethyl, propyl, isopropyl, butyl, isobutyl, hexyl, octyl, dodecyl, octadecyl) or $C_1$–$C_{18}$, preferably $C_1$–$C_7$, particularly $C_1$–$C_4$ substituted alkyl group {Examples of the substituents on these substituted alkyl groups include the various substituents represented by V (e.g., aryl group, unsaturated hydrocarbon group, carboxyl group, sulfo group, sulfato group, cyano group, halogen atom (e.g., fluorine, chlorine, bromine, iodine), hydroxyl group, mercapto group, alkoxy group, aryloxy group, alkylthio group, arylthio group, acyl group, alkoxycarbonyl group, aryloxycarbonyl group, acyloxy group, carbamoyl group, sulfamoyl group, heterocyclic group, alkylsulfonylcarbamoyl group, acylcarbamoyl group, acylsulfamoyl group, alkylsulfonylsulfamoyl group (These substituents may be further substituted))}.

The aryl group represented by R or R' is a $C_6$–$C_{20}$, preferably $C_6$–$C_{15}$, more preferably $C_6$–$C_{10}$ unsubstituted aryl group (e.g., phenyl, 1-naphthyl) or $C_6$–$C_{26}$, preferably $C_6$–$C_{21}$, more preferably $C_6$–$C_{16}$ substituted aryl group {Examples of the substituents on these substituted alkyl groups include the various substituents represented by V (e.g., alkyl group, aryl group, unsaturated hydrocarbon group, carboxyl group, sulfo group, sulfato group, cyano group, halogen atom (e.g., fluorine, chlorine, bromine, iodine), hydroxyl group, mercapto group, alkoxy group, aryloxy group, alkylthio group, arylthio group, acyl group, alkoxycarbonyl group, aryloxycarbonyl group, acyloxy group, carbamoyl group, sulfamoyl group, heterocyclic group, alkylsulfonylcarbamoyl group, acylcarbamoyl group, acylsulfamoyl group, alkylsulfonylsulfamoyl group (These substituents may be further substituted))}, preferably phenyl group.

The heterocyclic group represented by R or R' is a $C_1$–$C_{20}$, preferably $C_1$–$C_{15}$, more preferably $C_1$–$C_{10}$ unsubstituted heterocyclic group (e.g., pyrrole, furan, thiophene) or $C_1$–$C_{26}$, preferably $C_1$–$C_{21}$, more preferably $C_1$–$C_{16}$ substituted heterocyclic group {Examples of the substituents on these substituted heterocyclic groups include the various substituted represented by V}.

R and R' each are preferably a substituted group having an acid group or dissociative proton {group which can undergo dissociation (e.g., dissociation of proton or the like) to become an anionic group}, i.e., group which can have a negative charge such as proton-dissociative acid group which dissociates in a proportion of not smaller than 90% at a pH of from 5 to 10, e.g., carboxyl group, sulfo group, phosphonate group, boronate group, —$CONHSO_2$—, —$SO_2NHSO_2$—, —$CONHCO$—, —$SO_2NHCO$—}, more preferably an alkyl group substituted by the foregoing group having an acid group or dissociative proton, more preferably a substituted alkyl group containing any of carboxyl group, sulfo group, alkylsulfonylcarbamoyl group (e.g., methanesulfonylcarbonyl), acylcarbamoyl group (e.g., acetylcarbamoyl), acylsulfamoyl group (e.g., acetylsulfamoyl), and alkylsulfonylsulfamoyl group (e.g., methanesulfonyl sulfamoyl). Particularly preferred among these groups are carboxymethyl group, 2-sulfoethyl group, 3-sulfopropyl group, 3-sulfobutyl group, 4-sulfobutyl group, and methanesulfonylcarbamoylmethyl group.

M is incorporated in the general formula to indicate the presence of cation or anion when it is required to neutralize the ionic charge of dye. Which a dye is a cation or anion or whether or not the dye has a net ionic charge depends on its substituents. Representative examples of the cation include hydrogen ion ($H^+$), inorganic cation such as alkaline metal ion (e.g., sodium ion, potassium ion, lithium ion) and alkaline earth metal ion (e.g., calcium ion), and organic ion such as ammonium ion (e.g., ammonium ion, tetraalkylammonium ion, triethylammonium ion, pyridinium ion, ethylpyridinium ion, 1,8-diazabicyclo[5.4.0]-7-undecenium ion). The anion may be either an inorganic anion or organic anion. Examples of the inorganic or organic anion include halide anion (e.g., fluoride ion, chloride ion, bromide ion, iodide ion), substituted arylsulfonate ion (e.g., p-toluenesulfonate ion, p-chlorobenzenesulfonate ion), aryldisulfonate ion (e.g., 1,3-benzenesulfonate ion, 1,5-naphthalenedisulfonate ion, 2,6-naphthalenedisulfonate ion), alkylsulfate ion (e.g., methylsulfate ion), sulfate ion, thiocyanate ion, perchlorate ion, tetrafluoroborate ion, picrate ion, acetate ion, and trifluoromethanesulfonate ion. Further, ionic polymers or other dyes having a charge of polarity opposite that of the dye may be used.

Preferred among these cations are sodium ion, potassium ion, triethylammonium ion, tetraethylammonium ion, pyridinium ion, ethylpyridinium ion, and methylpyridinium ion. Preferred among these anions are perchlorate ion, iodide ion, bromide ion, and substituted arylsulfonante ion (e.g., p-toluenesulfonate ion).

The suffix m represents a number of not smaller than 0 required to equilibrate electric charge. The suffix m is 0 when an intramolecular salt is formed. The suffix m is preferably from not smaller than 0 to not greater than 4.

D is a group required to form a methine dye. Any methine dye can be formed by D. Preferred examples of methine dye to be used herein include cyanine dye, melocyanine dye, rhodacyanine dye, trinuclear melocyanine dye, tetranuclear melocyanine dye, allopolar dye, hemicyanine dye, and styryl dye. For the details of these dyes, reference can be made to F. M. Hamer, "Heterocyclic Compounds-Cyanine Dyes and Related Compounds", John Wiley & Sons, New York, London, 1964, D. M. Sturmer, "Heterocyclic Compounds-Special Topics in Heterocyclic Chemistry", Chapter 18, Article 14, pp. 482–515, etc.

Preferred examples of the general formula of these dyes are shown in U.S. Pat. No. 5,994,051, pp. 32–36, and U.S. Pat. No. 5,747,236, pp. 30–34. Preferred examples of the general formula of cyanine dye, melocyanine dye and rhodacyanine dye include general formulae (XI), (XII) and (XIII) disclosed in U.S. Pat. No. 5,340,694, columns 21–22 (with the proviso that $n_{12}$, $n_{15}$, $n_{17}$ and $n_{18}$ are not restricted but each are an integer of not smaller than 0 (preferably not greater than 4)). Preferred among these dyes are cyanine dye, melocyanine dye, and rhodacyanine dye. Particularly preferred among these dyes is cyanine dye.

The general formula (I), if the cyanine dye is formed by D or in like cases, may be represented by the following resonance formula (I'):

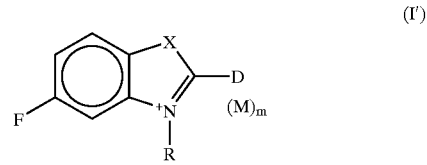

(I')

The sensitizing dye to be used in the present invention will be further described hereinafter.

In the present invention, one emulsion comprises at least two sensitizing dyes represented by the general formula (I). More preferably, the two sensitizing dyes represented by the general formula (I) each are a methine dye selected from the group consisting of those represented by the following general formulae (V), (VI), (VII) and (VIII).

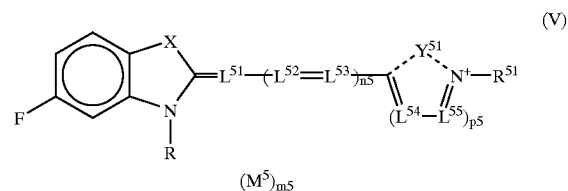

(V)

wherein X and R are the same as defined in the general formula (I); $L^{51}$, $L^{52}$, $L^{53}$, $L^{54}$ and $L^{55}$ each represent a methine dye; $p^5$ represents 0 or 1; $n^5$ represents 0, 1, 2, 3 or 4; $Y^{51}$ represents an atomic group required to form a 5- or 6-membered nitrogen-containing heterocyclic group and may be condensed with other carbon rings or heterocyclic rings or may have substituents; $M^5$ represents a counter ion; $m^5$ represents a number of from not smaller than 0 to not greater than 4 required to neutralize the electric charge in the molecule; and $R^{51}$ represents a substituted or unsubstituted alkyl, aryl or heterocyclic group.

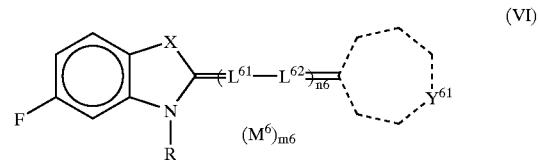

(VI)

wherein X and R are the same as defined in the general formula (I); $L^{61}$ and $L^{62}$ each represent a methine dye; $n^6$ represents 0, 1, 2, 3 or 4; $Y^{61}$ represents an atomic group required to form an acidic nucleus and may be condensed with other carbon rings or heterocyclic rings or may have substituents; $M^6$ represents a counter ion; and $m^6$ represents a number of from not smaller than 0 to not greater than 4 required to neutralize the electric charge in the molecule.

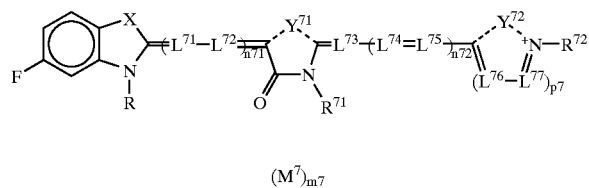

(VII)

$(M^7)_{m7}$ wherein X and R are the same as defined in the general formula (I); $L^{71}$, $L^{72}$, $L^{73}$, $L^{74}$, $L^{75}$, $L^{76}$ and $L^{77}$ each represent a methine dye; p7 represents 0 or 1; $n^{71}$ and $n^{72}$ each represent 0, 1, 2, 3 or 4; $Y^{71}$ and $Y^{72}$ each represent an atomic group required to form a 5- or 6-membered nitrogen-containing heterocyclic group and may have substituents, with the proviso that $Y^{72}$ maybe further condensed with other carbon rings or heterocyclic rings; $M^7$ represents a counter ion; $m^7$ represents a number of from not smaller than 0 to not greater than 4 required to neutralize the electric charge in the molecule; and $R^{71}$ and $R^{72}$ each represent a substituted or unsubstituted alkyl, aryl or heterocyclic group.

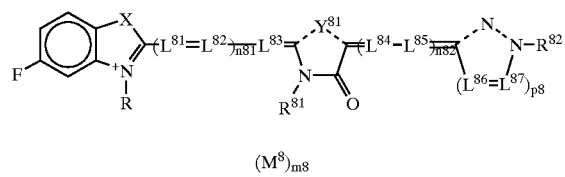

(VIII)

$(M^8)_{m8}$ wherein X and R are the same as defined in the general formula (I); $L^{81}$, $L^{82}$, $L^{83}$, $L^{84}$, $L^{85}$, $L^{86}$ and $L^{87}$ each represent a methine dye; $p^8$ represents 0 or 1; $n^{81}$ and $n^{82}$ each represent 0, 1, 2, 3 or 4; $Y^{81}$ and $Y^{82}$ each represent an atomic group required to form a 5- or 6-membered nitrogen-containing heterocyclic group and may have substituents, with the proviso that $Y^{82}$ maybe further condensed with other carbon rings or heterocyclic rings; $M^8$ represents a counter ion; $m^8$ represents a number of from not smaller than 0 to not greater than 4 required to neutralize the electric charge in the molecule; and $R^{81}$ and $R^{82}$ each represent a substituted or unsubstituted alkyl, aryl or heterocyclic group.

The 5- or 6-membered nitrogen-containing heterocyclic group represented by $Y^{51}$, $Y^{72}$ or $Y^{82}$ in the general formula (V), (VI), (VII) or (VIII) may be further condensed to other 5- or 6-membered carbon rings or heterocyclic rings. Examples of the carbon ring employable herein include benzene ring, and naphthalene ring. Examples of the heterocyclic ring employable herein include furan ring, and thiophene ring. Specific examples of these carbon or heterocyclic rings include those described as examples of $Z_{11}$, $Z_{12}$, $Z_{13}$, $Z_{14}$ and $Z_{16}$ in U.S. Pat. No. 5,340,694, columns 23–24.

$Y^{61}$ represents an atomic group required to form a non-cyclic or cyclic acidic nucleus and may be in the form of any acidic nucleus of ordinary melocyanine dye. In a preferred embodiment, a thiocarbonyl group or carbonyl group is disposed adjacent to the methine chain connecting site in $Y^{61}$.

The term "acidic nucleus" as used herein is defined in, e.g., T. H. James, "The Theory of the Photographic Process", 4th Edition, Macmillan Publishing Inc., 1977, page 198. For the details of the definition of acidic nucleus, reference can be made to U.S. Pat. Nos. 3,567,719, 3,575,869, 3,804,634, 3,837,862, 4,002,480, and 4,925,777, Japanese Patent Application (Laid-Open) No. 167546/1991, etc.

Preferred examples of the acidic nucleus which constitutes a 5- or 6-membered heterocyclic group carbon atom, nitrogen atom and chalcogen atom (representative examples: oxygen, sulfur, selenium and tellurium) include nuclei such as 2-pyrazoline-5-one, pyrazolidine-3,5-dione, imidazoline-5-one, hydantoin, 2-thiohydantoin, 4-thiohydantoin, 2-iminooxazolidine-4-one, 2-oxazoline-5-one, 2-thiooxazoline-2,4-dione, isooxazoline-5-one, 2-thiazoline-4-one, thiazolidine-4-one, thiazolidine-2,4-dione, rhodanine, thiazolidine-2,4-dithione, isorhodanine, indane-1,3-dione, thiphene-3-one, thiophene-3-one-1,1-dioxide, indoline-2-one, indoline-3-one, 2-oxoindazolinium, 3-oxoindazolinium, 5,7-dioxo-6,7-dihydrothiazolo[3,2-a]pyrimidine, cyclohexane-1,3-dione, 3,4-dihydroisoquinoline-4-one, 1, 3-dioxane-4, 6-dione, barbituric acid, 2-thiobarbituric acid, chroman-2,4-dione, indazoline-2-one, pyrido[1,2-a]pyrimidine-1,3-dione, pyrazolo[1,5-b]quinazolone, pyrazolo[1,5-a]benzimidazole, pyrazolopyridone, 1,2,3,4-tetrahydroquinoline-2,4-dione, 3-oxo-2,3-dihydrobenzo[d]thiophene-1,1-dioxide and 3-dicyanomethylene-2,3-dihydrobenzo[d]thiophene-1,1-dioxid e, and nuclei having an exomethylene structure obtained by substituting carbonyl group or thiocarbonyl group constituting these nuclei by an active methylene compound having a structure such as ketomethylene and cyanomethylene at the active methylene position.

Preferred among the groups represented by $Y^{61}$ are hydantoin, 2-thiohydantoin, 4-thiohydantoin, 2-oxazoline-5-one, 2-thiooxazoline-2,4-dione, thiazolidine-2,4-dione, rhodanine, thiazolidine-2,4-dithione, barbituric acid, and 2-thiobarbituric acid. Even more preferred among these groups are hydantoin, 2-thiohydantoin, 4-thiohydantoin, 2-oxazoline-5-one, rhodanine, barbituric acid, and 2-thiobarbituric acid. Particularly preferred among these groups are 2-thiohydantoin, 4-thiohydantoin, 2-oxazoline-5-one, rhodanine, and barbituric acid.

The 5- or 6-membered nitrogen-containing heterocyclic group formed by $Y^{71}$ or $Y^{81}$ is obtained by removing oxo group or thioxo group from the heterocyclic ring represented by $Y^{61}$. Preferred examples of the 5- or 6-membered nitrogen-containing heterocyclic group formed by $Y^{71}$ or $Y^{81}$ include those obtained by removing oxo group or thioxo group from hydantoin, 2-thiohydantoin, 4-thiohydantoin, 2-oxazoline-5-one, 2-thiooxazoline-2,4-dione, thiazolidine-2,4-dione, rhodanine, thiazolidine-2,4-dithione, barbituric acid, and 2-thiobarbituric acid. Even more preferred among these 5- or 6-membered nitrogen-containing heterocyclic groups are those obtained by removing oxo group or thioxo group from hydantoin, 2-thiohydantoin, 4-thiohydantoin, 2-oxazoline-5-one, rhodanine, barbituric acid, and 2-thiobarbituric acid. Particularly preferred among these 5- or 6-membered nitrogen-containing heterocyclic groups are those obtained by removing oxo group or thioxo group from 2-thiohydantoin, 4-thiohydantoin, 2-oxazoline-5-one, and rhodanine.

The substituent (referred to as "$R^{61}$" if any) on the nitrogen atom in $R^{51}$, $R^{71}$, $R^{72}$, $R^{81}$, $R^{82}$ and acidic nucleus $Y^{61}$ each represent a substituted or unsubstituted alkyl, aryl or heterocyclic group which is preferably a group described as an example of R in the methine dye of the general formula (I).

Preferred among $R^{51}$, $R^{61}$, $R^{71}$, $R^{72}$, $R^{81}$ and $R^{82}$ is a substituted or unsubstituted alkyl group, more preferably an alkyl group substituted by a group having acidic group or dissociative proton, further more preferably a substituted alkyl group containing any of carboxyl group, sulfo group, —CONHSO$_2$—, —SO$_2$NHSO$_2$—, —CONHCO—, and —SO$_2$NHCO—, particularly carboxylmethyl group, 2-sulfoethyl group, 3-sulfopropyl group, 3-sulfobutyl group, 4-sulfobutyl group or methanesulfonylcarbamoylmethyl group.

$L^{51}$, $L^{52}$, $L^{53}$, $L^{54}$, $L^{55}$, $L^{61}$, $L^{62}$, $L^{71}$, $L^{72}$, $L^{73}$, $L^{74}$, $L^{75}$, $L^{76}$, $L^{77}$, $L^{81}$, $L^{82}$, $L^{83}$, $L^{84}$ $L^{85}$, $L^{86}$ and $L^{87}$ each independently represent a methine group. These methine dyes each may have substituents. Examples of the substituents on the substituted methine group include the various substituents represented by V.

These methine groups may form a ring with other methine groups or $Y^{51}$, $Y^{61}$, $Y^{71}$, $Y^{72}$, $Y^{81}$ or $Y^{82}$.

$L^{54}$, $L^{55}$, $L^{76}$, $L^{77}$, $L^{86}$ and $L^{87}$ each are preferably an unsubstituted methine group.

The suffixes $n^5$, $n^6$, $n^{71}$, $n^{72}$, $n^{81}$ and $n^{82}$ each represent 0, 1, 2, 3 or 4. When $n^5$, $n^6$, $n^{71}$, $n^{72}$, $n^{81}$ and $n^{82}$ each are 2 or more, the methine group is repeated. However, these methine groups may not be the same. The suffixes $n^5$, $n^6$, $n^{71}$ and $n^{72}$ each are preferably 0, 1, 2 or 3, more preferably 0, 1 or 2, particularly 0 or 1. The suffixes $n^{72}$ and $n^{81}$ each are preferably 0 or 1, more preferably 0.

The suffixes $p^5$, $p^7$ and $p^8$ each independently represent 0 or 1, preferably 0.

$M^5$, $M^6$, $M^7$ and $M^8$ each represent a counter ion, preferably the same as M. The suffixes $m^5$, $m^6$, $m^7$ and $m^8$ each represent a number of not smaller than 0 required to neutralize the electric charge in the molecule. When an intramolecular salt is formed, $m^5$, $m^6$, $m^7$ and $m^8$ each are 0. The suffixes $m^5$, $m^6$, $m^7$ and $m^8$ each are preferably a number of from not smaller than 0 to not greater than 4.

Most desirable among these methine dyes is cyanine dye represented by the general formula (V), particularly a cyanine dye represented by the general formula (II). The dye represented by the general formula (II) will be further described hereinafter.

In the general formula (II), $X^1$ and $X^2$ each represent an oxygen atom, sulfur atom, selenium atom or $NR^3$ in which $R^3$ represents a substituted or unsubstituted alkyl, aryl or heterocyclic group. $X^1$ and $X^2$ each are preferably an oxygen atom or sulfur atom.

The condensed ring represented by $Y^1$ is an aromatic or non-aromatic hydrocarbon ring or heterocyclic ring or a polycyclic condensed ring having these rings in combination. Examples of these condensed rings include benzene ring, naphthalene ring, anthracene ring, phenathrene ring, fluorene ring, triphenylene ring, naphthacene ring, biphenyl ring, pyrrole ring, furan ring, thiophene ring, imdiazole ring, oxazole ring, thiazole ring, pyridine ring, pyrazine ring, pyrimidine ring, pyridazine ring, indolidine ring, indole ring, benzofuran ring, benzotiophene ring, isobenzofuran ring, quinolidine ring, quinoline ring, isoquinoline ring, phthalazine ring, naphthyridine ring, quinoxaline ring, quinoxazoline ring, carbazole ring, phenanthridine ring, acridine ring, phenanthroline ring, thianthrene ring, chromene ring, xanthene ring, phenoxathiin ring, phenothiazine ring, and phenazine ring. Preferred among these condensed rings are benzene ring, naphthalene ring, furan ring, thiophene ring, pyrrole ring, benzofuran ring, benzothiophene ring, and indole ring. Even more desirable among these condensed rings are benzene ring and naphthalene ring.

Examples of the substituents on $Y^1$ include the various substituents represented by V. Preferred among these substituents are alkyl group (e.g., methyl), aryl group (e.g., phenyl), aromatic heterocyclic group (e.g., 1-pyrrolyl), alkoxy group (e.g., methoxy), alkylthio group (e.g., methylthio), cyano group, and halogen atom (e.g., fluorine, chlorine, bromine, iodine). Even more desirable among these substituents is halogen atom, particularly chlorine atom or bromine atom.

Examples of the alkyl, aryl or heterocyclic group represented by $R^1$, $R^2$ or $R^3$ include those described as preferred examples of R with reference to the general formula (I). $R^1$, $R^2$ and $R^3$ each are preferably a group substituted by a group having an acidic group or dissociative proton {e.g., carboxyl group, sulfo group, phosphonate group, boronate group, —CONHSO$_2$—, —SO$_2$NHSO$_2$—, —CONHCO—, —SO$_2$NHCO—}, more preferably an alkyl group substituted by the group having an acidic group or dissociative proton, even more preferably a substituted alkyl group containing any of carboxyl group, sulfo group, alkylsulfonylcarbamoyl group (e.g., methanesulfonylcarbonyl), acylcarbamoyl group (e.g., acetylcarbamoyl), acylsulfamoyl group (e.g., acetylsulfamoyl), and alkylsulfonylsulfamoyl group (e.g., methanesulfonyl sulfamoyl). Particularly preferred among these groups are carboxymethyl group, 2-sulfoethyl group, 3-sulfopropyl group, 3-sulfobutyl group, 4-sulfobutyl group, and methane sulfonyl carbamoyl methyl group.

The two sensitizing dyes to be incorporated in the same emulsion layer of the present invention each preferably have at least two dissociative groups. More preferably, these dissociative groups are incorporated in $R^1$, $R^2$ or $R^3$ in the general formula (II). One of the two dissociative groups is preferably a sulfo group (—SO$_3$H) and the other is preferably a dissociative group other than sulfo group. The dissociative group other than sulfo group is selected from the group consisting of —COOH, —CONHSO$_2$Z, —SO$_2$NHCOZ, —SO$_2$NHSO$_2$Z and —CONHCOZ in which Z represents an alkyl group, aryl group, heterocyclic group, alkoxy group, aryloxy group, heterocyclyloxy group or amino group, preferably a lower alkyl group (e.g., methyl, ethyl).

The methine group represented by $L^1$, $L^2$ or $L^3$ may be unsubstituted or substituted. Examples of the substituents on the substituted methine group include the various substituents represented by V. When $n^1$ is 2 or more, the plurality of $L^2$'s or $L^3$'s may be the same or different. Preferably, $n^1$ is 0 or 1. $L^1$ and $L^3$ each are preferably an unsubstituted methine group, and $L^2$ is preferably a methine group substituted by an unsubstituted alkyl group.

Examples of $M^1$ include the various ions described with reference to M in the methine dye of the general formula (I). In particular, $M^1$ is preferably a cation. Preferred examples of the cation include sodium ion, potassium ion, triethylammonium ion, pyridinium ion, and N-ethylpyridinium ion.

The suffix $m^1$ represents a number of not smaller than 0 required to neutralize the electric charge in the molecule. When an intramolecular salt is formed, $m^1$ is 0. The suffix $m^1$ is preferably 0, 1, 2 or 3.

More preferably, the two sensitizing dyes to be incorporated in the same emulsion layer of the present invention are cyanine dyes having the same number of methine chains. It is particularly preferred that the two sensitizing dyes have the same $n^1$ in the general formula (II).

In the present invention, it is particularly preferred that a sensitizing dye represented by the general formula (III) be used. In the general formula (III), the alkyl group represented by $R^{11}$ or $R^{12}$ may be the same as described as a preferred example of R with reference to the general formula (I). $R^{11}$ and $R^{12}$ each are preferably an alkyl group substituted by a group having an acidic group or dissociative proton. At least one of $R^{11}$ and $R^{12}$ is substituted by a dissociative group other than sulfo group (particularly preferably by a —COOH group).

More preferably, one of $R^{11}$ and $R^{12}$ is a sulfoalkyl group (e.g., 2-sulfoethyl group, 3-sulfopropyl group, 3-sulfobutyl group, 4-sulfobutyl group) and the other is a substituted alkyl group (particularly carboxymethyl group or methanesulfonylcarbamoylmethyl group) containing any of carboxyl group, alkylsulfonylcarbamoyl group (e.g., methanesulfonylcarbonyl), acylcarbamoyl group (e.g., acetylcarbamoyl), acylsulfamoyl group (e.g., acetylsulfamoyl), and alkylsulfonylsulfamoyl group (e.g., methanesulfonyl sulfamoyl).

$X^{11}$ and $X^{12}$ each represent an oxygen atom or sulfur atom. One of $X^{11}$ and $X^{12}$ which has a group substituted by the dissociative group other than sulfo group is preferably a sulfur atom.

$Y^{11}$ represents a condensed naphthalene ring which may have substituents. Examples of the substituents on the substituted condensed naphthalene ring include the various substituents described with reference to the substituent V. $Y^{11}$ is preferably naphtho[1,2-d]azole-condensed and is preferably free of substituents.

The suffix $n^{11}$ represents 0 or 1, preferably 1.

$A^1$ is preferably an unsubstituted alkyl group, more preferably a methyl group or ethyl group, particularly an ethyl group.

Examples of $M^{11}$ include the various ions described with reference to M in the methine dye of the general formula (I). In particular, $M^{11}$ is preferably a cation. Preferred examples of the cation include sodium ion, potassium ion, triethylammonium ion, pyridinium ion, and N-ethylpyridinium ion.

The suffix $m^{11}$ represents a number of not smaller than 0 required to neutralize the electric charge in the molecule. When an intramolecular salt is formed, $m^{11}$ is 0. The suffix $m^{11}$ is preferably 0, 1, 2 or 3, more preferably 0 or 1.

Particularly preferred examples of the combination of two sensitizing dyes to be used in the present invention include the combination of a dye of the general formula (III) and a dye of the general formula (IV).

In the general formula (IV), the alkyl group represented by $R^{21}$ or $R^{22}$ maybe the same as described as a preferred example of R with reference to the general formula (I). $R^{21}$ and $R^{22}$ each are preferably an alkyl group substituted by a group having an acidic group or dissociative proton. At least one of $R^{21}$ and $R^{22}$ is substituted by a dissociative group other than sulfo group.

More preferably, one of $R^{21}$ and $R^{22}$ is a sulfoalkyl group (e.g., 2-sulfoethyl group, 3-sulfopropyl group, 3-sulfobutyl group, 4-sulfobutyl group) and the other is a substituted alkyl group (particularly carboxymethyl group or methanesulfonylcarbamoylmethyl group) containing any of carboxyl group, alkylsulfonylcarbamoyl group (e.g., methanesulfonylcarbonyl), acylcarbamoyl group (e.g., acetylcarbamoyl), acylsulfamoyl group (e.g., acetylsulfamoyl), and alkylsulfonylsulfamoyl group (e.g., methanesulfonyl sulfamoyl).

$X^{21}$ and $X^{22}$ each represent an oxygen atom or sulfur atom. One of $X^{21}$ and $X^{22}$ which has a group substituted by the dissociative group other than sulfo group is preferably a sulfur atom. More preferably, both $X^{21}$ and $X^{22}$ are a sulfur atom.

$Y^{21}$ represents a condensed benzene ring which may have substituents. Examples of the substituents on the substituted condensed benzene ring include the various substituents described with reference to the substituent V. However, these substituents are not connected to each other to form a condensed ring. Examples of these groups include alkyl group (e.g., methyl), aryl group (e.g., phenyl), aromatic heterocyclic group (e.g., 1-pyrrolyl), alkoxy group (e.g., methoxy), alkylthio group (e.g., methylthio), cyano group, and halogen atom (e.g., fluorine, chlorine, bromine, iodine). Preferred among these substituents is halogen atom, particularly chlorine atom or bromine atom.

The suffix $n^{21}$ represents a number of 0 or 1, preferably the same as $n^{11}$. More preferably, both $n^{11}$ and $n^{21}$ are 1.

$A^2$ is preferably an unsubstituted alkyl group, more preferably a methyl group or ethyl group, particularly an ethyl group.

Examples of $M^{21}$ include the various ions described with reference to M in the methine dye of the general formula (I). In particular, $M^{21}$ is preferably a cation. Preferred examples of the cation include sodium ion, potassium ion, triethylammonium ion, pyridinium ion, and N-ethylpyridinium ion.

The suffix $m^{21}$ represents a number of not smaller than 0 required to neutralize the electric charge in the molecule. When an intramolecular salt is formed, $m^{21}$ is 0. The suffix $m^{21}$ is preferably 0, 1, 2 or 3. More preferably, the suffix $m^{21}$ is 0 or 1.

Specific examples of the sensitizing dye of the present invention will be given below, but the present invention should not be construed as being limited thereto.

I-1

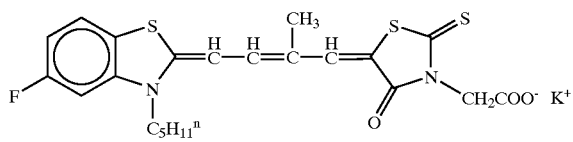

I-2

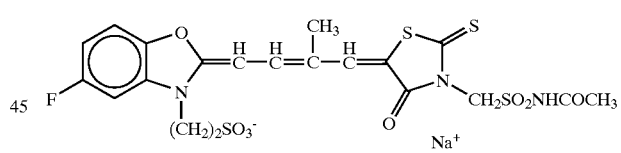

I-3

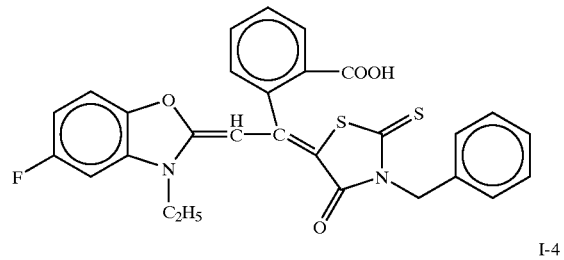

I-4

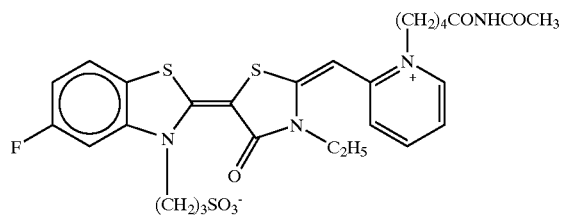

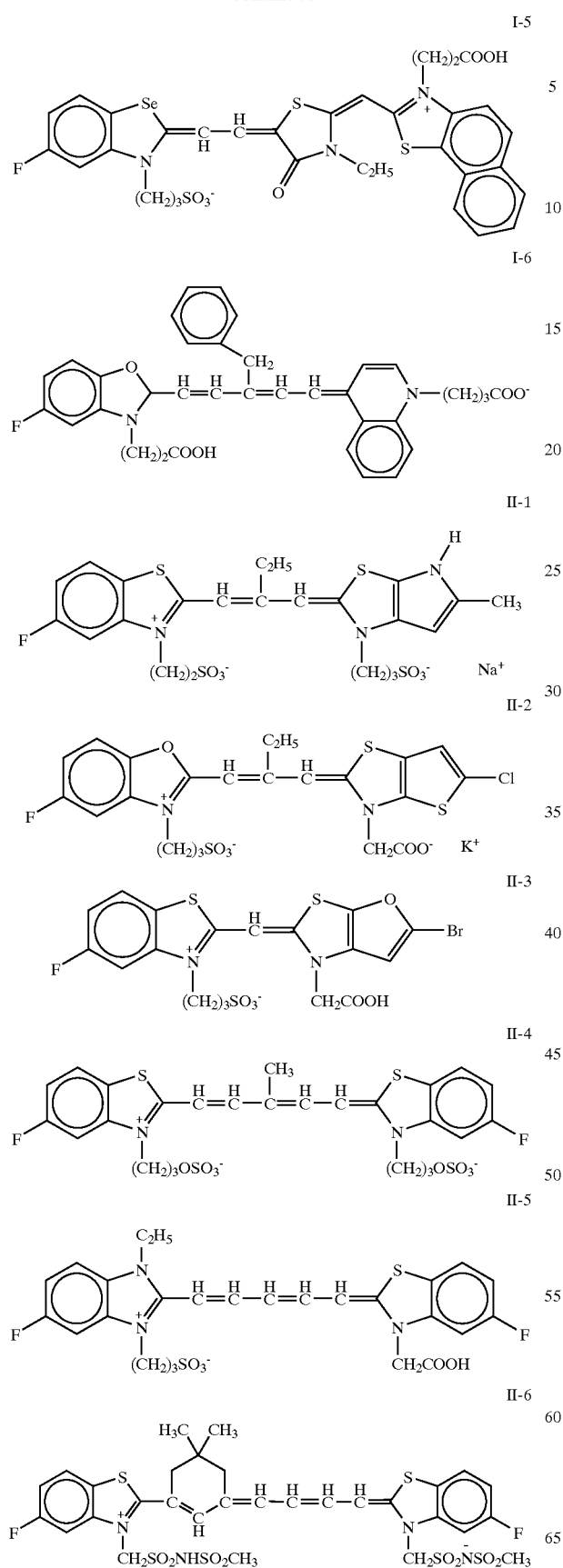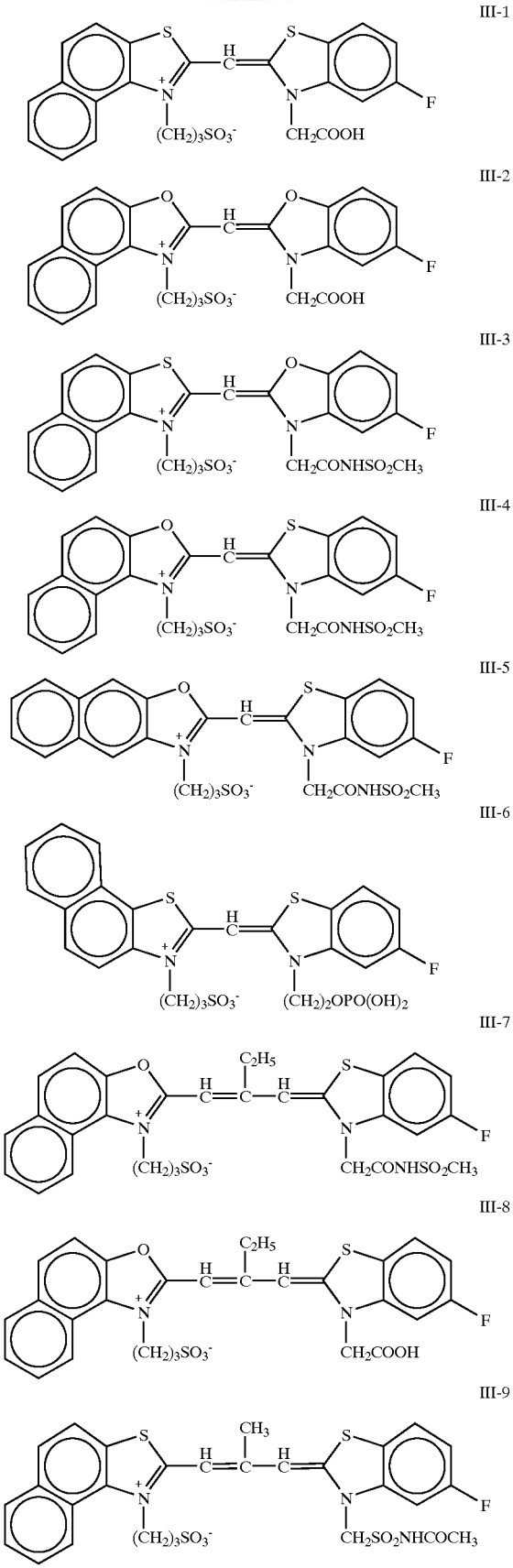

-continued
III-10
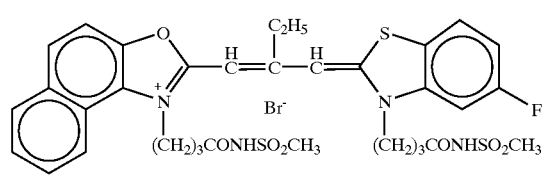
III-11
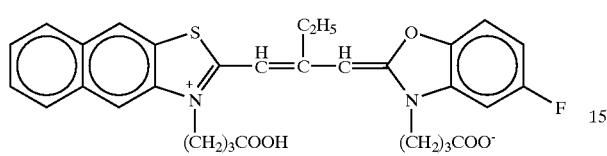
III-12
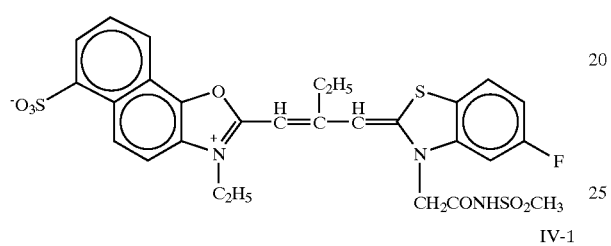
IV-1
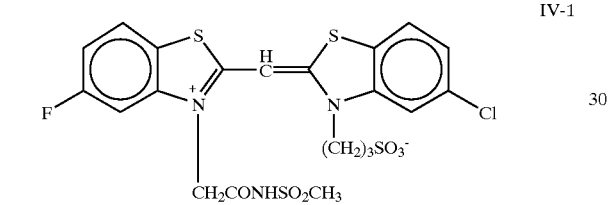
IV-2
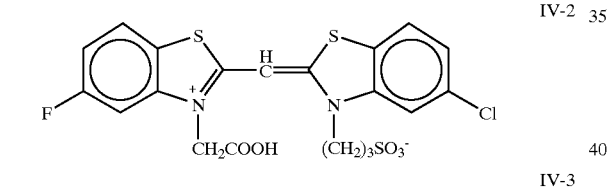
IV-3
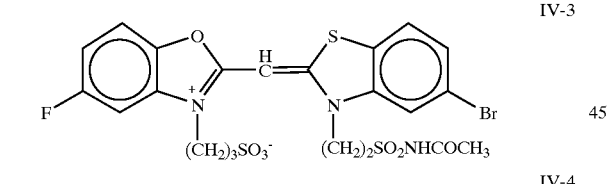
IV-4
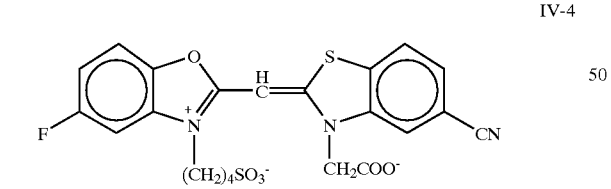
IV-5
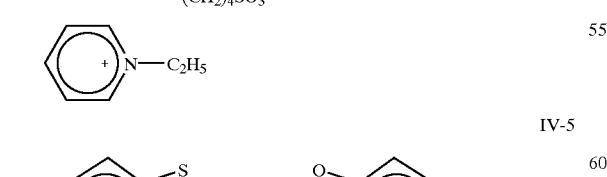
-continued
IV-6
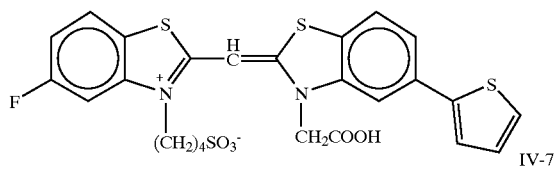
IV-7
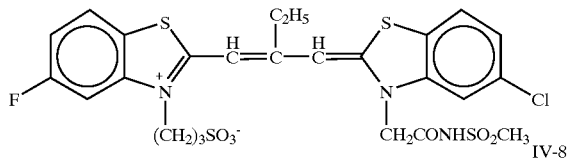
IV-8
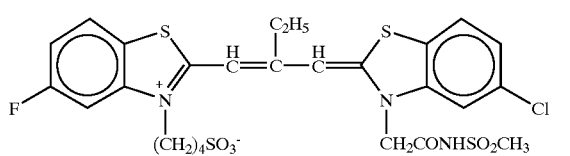
IV-9
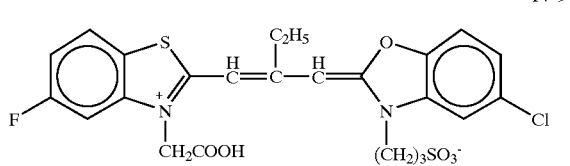
IV-10
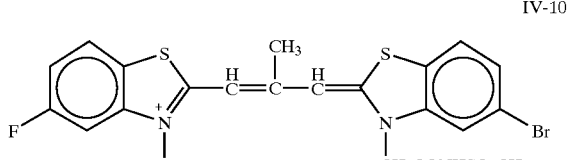
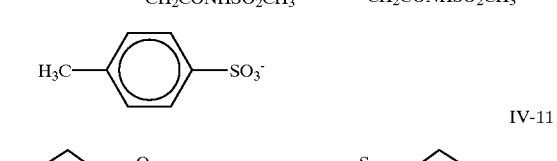
IV-11
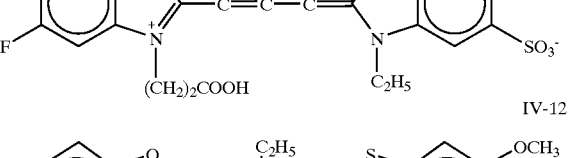
IV-12
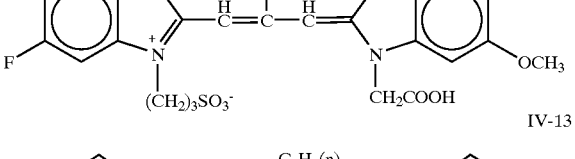
IV-13
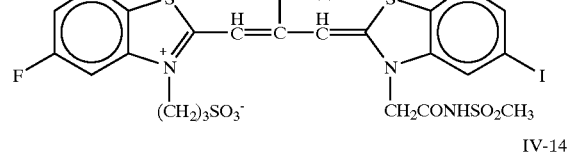
IV-14
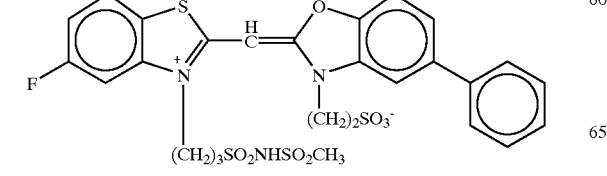

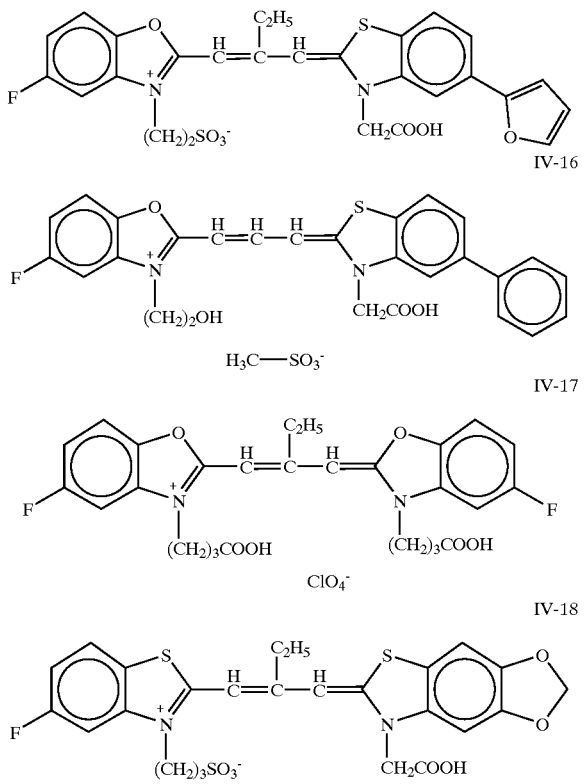

The synthesis of the compound represented by the general formula (I) (including dyes of lower concept) can be accomplished by the method described in F. M. Hamer, "Heterocyclic Compounds-Cyanine Dyes and Related Compounds", John Wiley & Sons, New York, London, 1964, D. M. Sturmer, "Heterocyclic Compounds-Special Topics in Heterocyclic Chemistry", Chapter 18, Article 14, pp. 482–515, John Wiley & Sons, New York, London, 1977, "Rodd's Chemistry of Carbon Compounds", 2nd Ed. vol. IV., part B, 1977, Chapter 15, pp. 369–422, Elsevier Science Publishing Company Inc., New York, etc.

The proportion of the amount of the two sensitizing dyes of the general formula (I) of the present invention to be incorporated in the emulsion is arbitrary. The molar ratio of the two sensitizing dyes to be added depends on the use and purpose but is preferably from 1,000/1 to 1/1,000, more preferably from 100/1 to 1/100, even more preferably from 10/1 to 1/10.

In the most desirable embodiment wherein one sensitizing dye of the general formula (III) of the present invention and one sensitizing dye of the general formula (IV) of the present invention are used, the molar ratio of the dye of the general formula (III) and the dye of the general formula (IV) is preferably from 10/1 to 1/100, more preferably from 5/1 to 1/30, even more preferably from 2/1 to 1/10.

In addition to the incorporation of at least two sensitizing dyes of the general formula (I) of the present invention in the same emulsion, these sensitizing dyes may be used in the same emulsion in combination with other sensitizing dyes falling outside the present invention. Preferred examples of these sensitizing dyes employable herein include cyanine dye, melocyanine dye, rhodacyanine dye, trinuclear melocyanine dye, tetranuclear melocyanine dye, allopolar dye, hemicyanine dye, and styryl dye. Preferred among these sensitizing dyes are cyanine dye, melocyanine dye, and rhodacyanine dye. Particularly preferred among these sensitizing dyes is cyanine dye. For the details of these dyes, reference can be made to F. M. Hamer, "Heterocyclic Compounds-Cyanine Dyes and Related Compounds", John Wiley & Sons, New York, London, 1964, D. M. Sturmer, "Heterocyclic Compounds-Special Topics in Heterocyclic Chemistry", Chapter 18, Article 14, pp. 482–515, etc.

Preferred examples of these dyes include those of the general formulae shown in U.S. Pat. No. 5,994,051, pp. 32–44, U.S. Pat. No. 5,747,236, pp. 30–39, and those exemplified in these patents.

Preferred examples of the general formula of cyanine dye, melocyanine dye and rhodacyanine dye include the general formulae (XI), (XII) and (XIII) shown in U.S. Pat. No. 5,340,694, columns 21–22 (with the proviso that $n_{12}$, $n_{15}$, $n_{17}$ and $n_{18}$ are not restricted but each are an integer of not smaller than 0 (preferably not greater than 4)).

These sensitizing dyes may be used singly or in combination of two or more thereof. A combination of sensitizing dyes is often used for the purpose of supersensitizing. Representative examples of such a combination of sensitizing dyes are described in U.S. Pat. Nos. 2,688,545, 2,977, 229, 3,397,060, 3,522,052, 3,527,641, 3,617,293, 3,628,964, 3,666,480, 3,672,898, 3,679,428, 3,303,377, 3,769,301, 3,814,609, 3,837,862 and 4,026,707, British Patents 1,344, 281 and 1,507,803, Japanese Patent Publication No. 49336/1968, Japanese Patent Publication No. 12375/1978, Japanese Patent Application (Laid-Open) No. 1977-110618, and Japanese Patent Application (Laid-Open) No. 1977-109925.

The emulsion may contain a dye which doesn't have a spectral sensitizing effect itself or a material which doesn't substantially absorb visible light but exerts supersensitizing effect in combination with sensitizing dyes.

For the details of supersensitizers useful in spectral sensitization in the present invention (e.g., pyrimidylamino compound, triazinylamino compound, azolium compound, aminostyryl compound, aromatic organic acid-formaldehyde condensate, azaindene compound, cadmium salt) and combination of supersensitizer and sensitizing dye, reference can be made to U.S. Pat. Nos. 3,511,664, 3,615, 613, 3,615,632, 3,615,641, 4,596,767, 4,945,038, 4,965,182, 4,965,182, 2,933,390, 3,635,721, 3,743,510, 3,617,295, and 3,635,721. For preferred examples of their uses, too, reference can be made to these patents.

The silver halide photographic material of the present invention will be further described hereinafter.

The time at which the methine dye of the present invention is added to the silver halide emulsion may be any step during the preparation of emulsion which has heretofore been considered useful (This can apply also to other sensitizing dyes and supersensitizers). As disclosed in U.S. Pat. Nos. 2,735,766, 3,628,960, 4,183,756 and 4,225,666, Japanese Patent Application (Laid-Open) No. 1983-184142, and Japanese Patent Application (Laid-Open) No. 1985-196749, the methine dye of the present invention may be added at any time during the formation of silver halide grains and/or before desalting or any time during desalting and/or between desalting and the beginning of chemical ripening. As disclosed in Japanese Patent Application (Laid-Open) No. 1983-113920, the methine dye of the present invention may be added at any time shortly before or during chemical ripening or between chemical ripening and application of emulsion. Alternatively, as disclosed in U.S. Pat. No. 4,225, 666 and Japanese Patent Application (Laid-Open) No. 1983-7629, the same compound may be added singly or in combination with compounds of foreign structure, e.g., at any time during the formation of grains and during or after completion of chemical ripening or at any time before or during chemical ripening and after chemical ripening. The kind of compound to be added separately and combination of compounds to be added may be varied.

The amount of the methine dye of the present invention to be added depends on the shape and size of the silver halide grains but is normally from $1\times10^{-6}$ to $8\times10^{-3}$ mols per mol of silver halide (This applies also to other sensitizing dyes and supersensitizers). For example, when the size of silver halide grains is from 0.2 $\mu$m to 1.3 $\mu$m, the amount of the methine dye of the present invention to be added is preferably from $2\times10^{-6}$ to $3.5\times10^{-3}$ mols, more preferably from $7.5\times10^{-6}$ to $1.5\times10^{-3}$ mols per mol of silver halide.

The methine dye of the present invention may be dispersed directly in the emulsion (This applies also to other sensitizing dyes and supersensitizers). Alternatively, the methine dye of the present invention may be added to the emulsion in the form of solution in a proper solvent such as methyl alcohol, ethyl alcohol, methyl cellosolve, acetone, water, pyridine and mixture thereof. In this case, additives such as base, acid and surface active agent may coexist in the emulsion. The dissolution of the methine dye of the present invention and additives in the solvent can be accomplished with the aid of ultrasonic wave. Examples of the method for adding the methine dye of the present invention to the emulsion include a method disclosed in U.S. Pat. No. 3,469,987 which comprises dissolving the compound in a volatile organic solvent, dispersing the solution in a hydrophilic colloid, and then adding the dispersion to the emulsion, a method disclosed in Japanese Patent Publication No. 24185/1961 which comprises dispersing the compound in a water-soluble solvent, and then adding the dispersion to the emulsion, a method disclosed in U.S. Pat. No. 3,822,135 which comprises dissolving the compound in a surface active agent, and then adding the solution to the emulsion, a method disclosed in Japanese Patent Application (Laid-Open) No. 1976-74624 which comprises dissolving the compound in a red-shifting compound, and then adding the solution to the emulsion, and a method disclosed in Japanese Patent Application (Laid-Open) No. 1975-80826 which comprises dissolving the compound in an acid substantially free of water, and then adding the solution to the emulsion. Besides these methods, the addition of the compound to the emulsion can be accomplished by the method disclosed in U.S. Pat. Nos. 2,912,343, 3,342,605, 2,996,287 and 3,429,835.

Examples of the organic solvent in which the sensitizing dye of the present invention is dissolved include methyl alcohol, ethyl alcohol, n-propanol, isopropanol, n-butanol, isobutanol, t-butanol, benzyl alcohol, fluoroalcohol, methyl cellosolve, acetone, pyridine, and mixture thereof.

During the dissolution of the sensitizing dye in water, the foregoing organic solvent or mixture thereof, a base is preferably added. As such a base there may be used either an organic base or inorganic base. Examples of these bases include amine derivatives (e.g., triethylamine, triethanolamine), pyridine derivatives, sodium hydroxide, potassium hydroxide, sodium acetate, and potassium acetate. A preferred method for dissolving the sensitizing dye of the present invention in the solvent is a method which comprises adding the dye to a mixture of water and methanol, and then adding triethylamine to the solution in an amount equimolecular with the dye.

As the granular silver halide to be incorporated in the silver halide emulsion of the present invention there may be used any of silver chloride, silver bromide, silver bromochloride, silver bromoiodide, silver chloroiodide and silver bromochloroiodide. For example, if used for color photographic paper, the silver halide emulsion preferably is a silver bromochloride emulsion for the purpose of expediting and simplifying processing. As such a silver bromochloride emulsion there is preferably used a silver chloride, silver bromochloride or silver bromochloroiodide emulsion having a silver chloride content of not smaller than 95 mol-%. In particular, silver bromochloride or silver chloride substantially free of silver iodide is preferably used to reduce the development time. Alternatively, if used for color picture taking film (negative and reversal), the silver halide emulsion preferably is a silver bromoiodide emulsion. As such a silver bromoiodide emulsion there is preferably used silver bromide, silver bromoiodide or silver bromochloroiodide emulsion having a silver bromide content of not smaller than 95 mol-%.

The average size of silver halide grains to be incorporated in the silver halide emulsion of the present invention is preferably from 0.1 $\mu$m to 2 $\mu$m as calculated in terms of number-average of diameter of circles having the same area as the projected area of grains.

The distribution of grain sizes is preferably as so-called monodisperse as not greater than 20%, preferably not greater than 15%, more preferably not greater than 10% as calculated in terms of coefficient of variation (obtained by dividing the standard deviation of grain size distribution by the average grain size). In this case, for the purpose of obtaining a wide latitude, the foregoing monodisperse emulsions are preferably incorporated in the same layer in admixture or applied in a multi-layer coating process.

The shape of the silver halide grains to be incorporated in the photographic emulsion may be a regular crystal form such as cube, octahedron and tetradecahderon, irregular crystal form such as sphere and plate or mixture thereof. The emulsion of the present invention preferably comprises grains having the foregoing regular crystal form in an amount of not smaller than 50%, more preferably not smaller than 70%, even more preferably not smaller than 90%.

The preparation of the emulsion to be used in the present invention can be accomplished by the method disclosed in P. Glafkides, "Chimie et Phisique Photographique", Paul Montel, 1967, G. F. Duffin, "Photographic Emulsion Chemistry", Focal Press, 1966, V. L. Zelikman et al, "Making and Coating Photographicn Emulsion", Focal Press, 1964, etc. In some detail, any of acid method, neutral method and ammonia method may be used. The reaction of the soluble silver salt with the soluble halogen salt can be accomplished by single jet method or double jet method, singly or in combination. A method involving the formation of grains in the atmosphere of excess silver ions (so-called reverse mixing method) may be used. As one of double jet methods there may be used a method which comprises keeping the pAg value of the liquid phase in silver halide is produced constant, i.e., so-called controlled double jet method. The use of this method makes it possible to obtain a silver halide emulsion having a regular crystal form and a substantially uniform grain size.

The emulsion of the present invention preferably comprises tabular grains having an aspect ratio of not smaller than 2 (preferably not larger than 1,000) in an amount of not smaller than 50%, more preferably not smaller than 70%, even more preferably not smaller than 80% based on the total projected area of silver halide grains incorporated therein.

In general, a tabular grain is in the form of tablet having two parallel planes. Thus, the "thickness" of a tabular grain is represented by the distance between the two parallel planes constituting the tabular grain. The diameter of a silver halide grain is defined by the diameter of the circle having the same area as the projected area of the grain as viewed in its electron microphotograph. The ratio of diameter to thickness is called aspect ratio.

The aspect ratio of the silver halide grain of the present invention is preferably from 4 to 100, more preferably from 6 to 80, particularly from 8 to 60. For example, if the silver halide emulsion is used for color photographic paper, a tabular silver bromochloride grain is preferably used. If the silver halide emulsion is used for color picture taking film, a tabular silver bromoiodide grain is preferably used.

Referring further to the tabular silver bromochloride grain for color photographic paper, it has a silver chloride content of not smaller than 80 mol-%. Even more preferably, the tabular silver bromochloride grain is a high silver chloride grain having a silver chloride as high as not smaller than 95%.

The silver bromochloride grain preferably comprises a core portion and a shell portion (outermost layer) having a higher iodide content than the core portion. The core portion preferably is formed by silver chloride in an amount of not smaller than 90%. The core portion may comprise two or more portions having different halogen compositions. The shell portion preferably accounts for not greater than 50%, particularly not greater than 20%, of the total volume of particle. The shell portion preferably has a silver iodide content of from 0.5 to 13 mol-%, particularly from 1 to 6 mol-%. The content of silver iodide in all silver halide grains is preferably from 0.1 to 5 mol-%, particularly from 0.1 to 2 mol-%. The silver iodide content of the core portion is preferably not greater than 1 mol-%, particularly 0%.

The silver bromide content may differ from the core portion to the shell portion. The silver bromide content is preferably from 0 to 20 mol-%, particularly from 0.1 to 5 mol-% based on the total amount of silver.

The diameter of high silver chloride tabular grain is preferably from 0.2 $\mu$m to 1.0 $\mu$m. The thickness of high silver chloride tabular grain is not greater than 0.2 $\mu$m, preferably not greater than 0.15 $\mu$m, particularly not greater than 0.1 $\mu$m. The aspect ratio of high silver chloride tabular grain is preferably from 3 $\mu$m to 20 $\mu$m, more preferably from 5 $\mu$m to 15 $\mu$m.

The distribution of size of high silver chloride tabular grains may be either polydisperse or monodisperse, preferably monodisperse. The coefficient of dispersion of grain sizes is preferably from 5% to 25%, particularly from 5% to 20%.

The coefficient of dispersion of grain thicknesses is preferably from 5% to 25%, particularly from 5% to 15%.

In order to form 111 plane as an outer surface in the high silver chloride tabular grain for color photographic paper, a crystal phase controller is used. The formation of a tabular grain can be accomplished by producing two parallel twinning planes. The formation of twinning planes is governed by the temperature, dispersant (gelatin), halogen concentration, etc. Therefore, these conditions need to be properly predetermined. In the case where a crystal phase controller is present during nucleation, the gelatin concentration is preferably from 0.1% to 10%. The concentration of chloride is not smaller than 0.01 mol/l, preferably not smaller than 0.03 mol/l.

For the details of the crystal phase controller (i.e., the crystal habit-controlling agent) to be used and the method for forming 111 high silver chloride tabular grain using this crystal phase controller, reference can be made to Japanese Patent Application (Laid-Open) No. 2000-29156.

The tabular grain of the present invention maybe a tabular grain having (100) plane as a main plane. The shape of the main plane is a rectangular parallelogram, a triangle, rectangle or pentagon obtained by removing one corner from the rectangular parallelogram (the corner to be removed is a right-angled triangle formed by the corner as apex and two sides forming the corner) or a rectangle, pentagon, hexagon, heptagon or octagon having 2 to 4 such lost portions.

For the details of method for forming a tabular silver halide grain having (100) main plane, reference can be made to Japanese Patent Application (Laid-Open) No. 1994-301129, Japanese Patent Application (Laid-Open) No. 1994-347929, Japanese Patent Application (Laid-Open) No. 1997-34045, Japanese Patent Application (Laid-open) No. 1997-96881, Japanese Patent Application (Laid-Open) No. 1996-122954, and Japanese Patent Application (Laid-Open) No. 1997-189977. The tabular silver bromide grain to be incorporated in the color picture taking film is preferably silver bromoiodide, silver chloroiodide or silver bromoiodide having a silver iodide content of not greater than 30 mol-%. In particular, silver bromoiodide or silver bromochloroiodide having a silver iodide content of from 2 to 10 mol-% is preferred. The tabular silver bromide grain may contain silver chloride. The silver chloride content of the silver bromide grain is preferably not greater than 8 mol-%, more preferably not greater than 3 mol-% or 0 mol-%.

The tabular silver bromoiodide grain preferably has a diameter of from 0.3 $\mu$m to 5.0 $\mu$m and a thickness of 0.05 to 0.5 $\mu$m. The tabular silver bromoiodide grain preferably has an aspect ratio of from 3 to 50, more preferably from 4 to 30, even more preferably from 5 to 25.

The silver halide emulsion to be used in the present invention is normally subjected to chemical sensitization. Examples of the chemical sensitization process employable herein include so-called gold sensitization process with a gold compound (as disclosed in U.S. Pat. Nos. 2,448,060 and 3,320,069), sensitization process with a metal such as iridium, platinum, rhodium and palladium (as disclosed in U.S. Pat. Nos. 2,448,060, 2,566,245 and 2,566,263), sulfur sensitization process with a sulfur-containing compound (as disclosed in U.S. Pat. No. 2,222,264), selenium sensitization process with a selenium compound, tellurium sensitization process with a tellurium compound, and reduction sensitization with a stannous salt, thiourea dioxide, polyamine or the like (as disclosed in U.S. Pat. Nos. 2,487,850, 2,518,698 and 2,521,925). These sensitization processes may be used singly or in combination.

The emulsion of the present invention is preferably subjected to chemical sensitization with a selenium sensitizer.

As such a selenium sensitizer there may be used any selenium compound disclosed in conventional known patents. In some detail, the emulsion is normally stirred at a high temperature, preferably not lower than 40° C., with a labile selenium compound and/or non-labile selenium compound. As the labile selenium compound there is preferably used a compound described in Japanese Patent Publication No. 15748/1969, Japanese Patent Publication No. 13489/1968, Japanese Patent Application (Laid-Open) No. 1992-25832, and Japanese Patent Application (Laid-Open) No. 1992-109240. Specific examples of the labile selenium sensitizer employable herein include isoselenocyanates (e.g., aliphatic isoselenocyanate such as allylisoselenocyanate), selenoureas, selenoketones, selenoamides, selenocarboxylic acids (e.g., 2-selenopropionic acid, 2-selenobutyric acid), selenoesters, diacylselenides (e.g., bis(3-chloro-2,6-dimethoxybenzoyl) selenide), selenophosphates, phosphineselenides, and colloidal metal selenium.

Preferred types of labile selenium compound have been described hereinabove, but the present invention should not be construed as being limited thereto. It is generally understood by those skilled in the art that the structure of a labile selenium compound as a sensitizer for photographic emulsion is not so important so far as selenium is labile and the organic moiety of the selenium sensitizer molecule has no functions other than supporting selenium and allowing it to be present in the emulsion in a labile form. In the present invention, a labile selenium compound having such a wide concept can be used to advantage.

As the non-labile selenium compound employable herein there may be used a compound disclosed in Japanese Patent Publication No. 4553/1971, Japanese Patent Publication No. 34492/1977 and Japanese Patent Publication No. 34491/1977. Examples of the non-labile selenium compound employable herein include selenous acid, potassium selenocyanide, selenazoles, quaternary salt of selenazoles, diaryl selenide, diaryl diselenide, dialkyl selenide, dialkyl diselenide, 2-selenazolidinedion, 2-selenooxazolidinethione, and derivatives thereof.

Preferred among these selenium compounds are those of the general formulae (VII) and (VIII) disclosed in Japanese Patent Application (Laid-Open) No. 1999-15115. These selenium sensitizers are added during chemical sensitization in the form of solution in water or an organic solvent such as methanol and ethanol, singly or in admixture. Preferably, these selenium sensitizers are added before the beginning of chemical sensitization. The number of selenium sensitizers to be used is not restricted to one. Two or more of the selenium sensitizers may be used in combination. The combined use of a labile selenium compound and a non-labile selenium compound is desirable.

The amount of the selenium sensitizers to be added depends on the activity of the selenium sensitizers used, the kind and size of silver halide, the temperature and time of ripening, etc. but preferably is not smaller than $1 \times 10^{-8}$ mols, more preferably from $1 \times 10^{-7}$ to $5 \times 10^{-5}$ mols per mol of silver halide in the emulsion. The temperature of chemical ripening with a selenium sensitizer is preferably not lower than 45° C., more preferably from 50° C. to 80° C. The pAg and pH values of the selenium sensitizer are arbitrary. When the pH value of the selenium sensitizer falls within the range of from 4 to 9, the effect of the present invention can be exerted.

The silver halide emulsion to be used in the present invention may comprise various compounds or precursors thereof incorporated therein for the purpose of inhibiting fogging during the preparation, storage or photographic processing of photographic light-sensitive material or stabilizing the photographic properties. Specific examples of these compounds include those described in the above cited Japanese Patent Application (Laid-Open) No.1987-215272, pp.39–72. Further, 5-arylamino-1,2,3,4-thiatriazole compounds (the aryl residue has at least one electron attractive group) disclosed in EP0447647 are preferably used.

The silver halide emulsion prepared according to the present invention can be incorporated in both color photographic light-sensitive material and black-and-white photographic light-sensitive material. Examples of the color photographic light-sensitive material to which the silver halide emulsion of the present invention can be applied include color photographic paper, color picture taking film, and color reversal film. Examples of the black-and-white photographic light-sensitive material to which silver halide emulsion of the present invention can be applied include X-ray film, ordinary picture taking film, and film for printing photographic light-sensitive material.

The silver halide photographic material of the present invention may comprise at least one light-sensitive layer provided on a support. Typically, the silver halide photographic material of the present invention comprises at least one light-sensitive layer comprising a plurality of silver halide emulsion layers having substantially the same color sensitivity but different light sensitivities provided on a support. In the case where the silver halide photographic material of the present invention is a multi-layer color photographic light-sensitive material, there are provided a blue-sensitive layer (BL), a green-sensitive layer (GL) and a red-sensitive layer (RL). The order of disposition of these color-sensitive layers as viewed from the support may differ with the purpose of the light-sensitive material. The order of disposition of these color-sensitive layers in the ordinary picture taking color-sensitive material as viewed from the support is RL-GL-BL. The order of disposition of these color-sensitive layers in the printing color photographic light-sensitive material (photographic paper) as viewed from the support is BL-GL-RL in most cases. A light-insensitive layer may be provided interposed between these light-sensitive silver halide emulsion layers and on the uppermost or lowermost layer.

In order to improve color reproducibility, a donor layer with an interlayer effect having a spectral sensitivity distribution different from that of the main light-sensitive layer such as BL, GL and RL as disclosed in U.S. Pat. Nos. 4,663,271, 4,705,744 and 4,707,436, Japanese Patent Application (Laid-Open) No. 1987-160448 and Japanese Patent Application (Laid-Open) No. 1988-89850 is preferably provided adjacent to or in the vicinity of the main light-sensitive layer.

The silver halide photographic material of the present invention may comprise the foregoing various additives incorporated therein but may further comprise other various additives incorporated therein depending on the purpose.

For the details of these additives, reference can be made to Research Disclosure, Item 17643 (December 1978), Item 18716 (November 1979) and Item 308119 (December 1989). The sites of disclosure will be tabulated below.

|  | Kind of additive | RD17643 | RD18716 | RD308119 |
|---|---|---|---|---|
| 1. | Chemical sensitizer | p. 23 | RC, p. 648 | p. 996 |
| 2. | Sensitivity-increasing agent |  | RC, p. 648 |  |
| 3. | Spectral sensitizer, supersensitizer | pp. 23–24 | RC, p. 648–RC, p. 649 | RC, p. 996–RC, p. 996 |
| 4. | Brightening agent | p. 24 |  | RC, p. 998 |
| 5. | Fog inhibitor, stabilizer | pp. 24–25 | RC, p. 649 | RC, p. 998–RC, p. 1,000 |
| 6. | Light-absorber, filter, ultraviolet absorber | pp. 25–26 | RC, p. 649–LC, p. 650 | LC, p. 1003–RC, p. 1003 |
| 7. | Stain inhibitor | RC, p. 25 | LC–RC, p. 650 | RC, p. 1002 |
| 8. | Dye image stabilizer | p. 25 |  | RC, p. 1002 |
| 9. | Hardening agent | p. 26 | LC, p. 651 | RC, p. 1004–LC, p. 1005 |
| 10. | Binder | p. 26 | LC, p. 651 | RC, p. 1003–RC, p. 1004 |
| 11. | Plasticizer, lubricant | p. 27 | RC, p. 650 | LC, p. 1006–RC, p. 1006 |
| 12. | Coating aid, surface active agent | pp. 26–27 | RC, p. 650 | LC, p. 1005–LC, p. 1004 |
| 13. | Antistatic agent | p. 27 | RC, p. 650 | RC, p. 1006–LC, p. 1007 |
| 14. | Matting agent |  |  | LC, p. 1008–LC, p. 1009 |

For the details of the emulsion of the present invention, technique for arrangement of layers in the photographic light-sensitive material comprising the emulsion, the silver halide emulsion, the functional couplers such as dye-forming coupler and DIR coupler, various additives, and development, reference can be made to EP0565096A1 (disclosed on Oct. 13, 1993) and patents cited therein. These technical items and the sites of disclosure thereof will be tabulated below.

1. Layer constitution: Lines 23–35, p. 61; line 41, p. 61—line 14, p. 62
2. Interlayer: Lines 36–40, p. 61
3. Interlayer effect-providing layer: Lines 15–18, p. 62
4. Halogen formulation of silver halide: Lines 21–25, p. 62
5. Crystal habit of silver halide grain: Line 26–30, p. 62
6. Size of silver halide grain: Lines 31–34, p. 62
7. Process for the preparation of emulsion: Lines 35–40, p. 62
8. Distribution of size of silver halide grains: Lines 41–42, p. 62
9. Tabular grain: Lines 43–46, p. 62
10. Internal structure of grain: Lines 47–53, p. 62
11. Type of formation of latent image in emulsion: Line 54, p. 62—line 5, p. 63
12. Physical ripening/chemical sensitization of emulsion: Lines 6–9, p. 63
13. Combined use of emulsions: Lines 10–13, p. 63
14. Fogging emulsion: Lines 14–31, p. 63
15. Light-insensitive emulsion: Lines 32–43, p. 63
16. Coated amount of silver: Lines 49–50, p. 63
17. Formaldehyde scavenger: Lines 54–57, p. 64
18. Mercapto-based fog inhibitor: Lines 1–2, p. 65
19. Fogging agent-releasing agent: Lines 3–7, p. 65
20. Dye: Lines 7–10, p. 65
21. Color coupler (general): Lines 11–13, p. 65
22. Yellow, magenta and cyan couplers: Lines 14–25, p. 65
23. Polymer coupler: Lines 26–28, p. 65
24. Diffusive dye-forming coupler: Lines 29–31, p. 65
25. Colored coupler: Lines 32–38, p. 65
26: Functional coupler (general): Lines 39–44, p. 65
27. Bleach accelerator-releasing agent: Lines 45–48, p. 65
28. Development accelerator-releasing coupler: Lines 49–53, p. 65
29. Other DIR couplers: Line 54, p. 65—line 4, p. 66
30. Method for dispersing coupler: Lines 5–28, p. 66
31. Preservative/mildewproofing agent: Lines 29–33, p. 66
32. Kind of photographic light-sensitive material: Lines 34–36, p. 66
33. Thickness and swelling rate of light-sensitive layer: Line 40, p. 66—line 1, p. 67
34. Back layer: Lines 3–8, p. 67
35. Development (general): Lines 9–11, p. 67
36. Developer and developing agent: Lines 12–30, p. 67
37. Additive to developer: Lines 31–44, p. 67
38. Reversal processing: Lines 45–56, p. 67
39. Percentage opening of processing tank: Line 57, p. 67—line 12, p. 68
40. Development time: Lines 13–15, p. 68
41. Blix, bleaching, fixing: Line 16, p. 68—line 31, p. 69
42. Automatic developing machine: Lines 32–40, p. 69
43. Water washing, rinsing, stabilization: Line 41, p. 69—line 18, p. 70
44. Replenishment and reuse of processing solution: Lines 19–23, p. 70
45. Incorporation of developing agent in photographic light-sensitive material: Lines 24–33, p. 70
46. Development temperature: Lines 34–38, p. 70
47. Use in film with lens: Lines 39–41, p. 70

EXAMPLE

The present invention will be further described in the following examples, but the present invention should not be construed as being limited thereto.

EXAMPLE 1

Preparation of Samples 100 to 105

To an aqueous solution of gelatin which had been kept at a temperature of 70° C. were added an aqueous solution of silver nitrate and an aqueous solution containing potassium bromide and potassium iodide by a double jet process while the pBr value thereof was being kept at 4.5 to prepare a primitive emulsion of octahedral grains of silver bromoiodide having an average size of 0.4 $\mu$m (relative standard deviation: 9.3%) and an average silver iodide content of 4.0 mol-%. The primitive emulsion thus obtained was then subjected to optimum gold-sulfur sensitizing with sodium thiosulfate and sodium chloroaurate. To the emulsion were then each added the sensitizing dyes set forth in Table 1 below to prepare various emulsions which were each then applied to a cellulose triacetate support in an amount of 2 $\mu$g per cm$^2$ to prepare Samples 100 to 105.

The coated materials thus obtained were each exposed to white light at a luminance of 1,000 lux for $\frac{1}{100}$ second, and then subjected to development with the following processing solution.

| (Processing solution) | |
|---|---|
| 1-Phenyl-3-pyrazolidone | 0.5 g |
| Hydroquinone | 10 g |
| Disodium ethylenediaminetetraacetate | 2 g |
| Potassium sulfite | 60 g |
| Boric acid | 4 g |
| Potassium carbonate | 20 g |
| Potassium bromide | 5 g |
| Diethylene glycol | 20 g |
| pH (adjusted with sodium hydroxide) | 10.0 |
| Water to make | 1 liter |

The samples thus processed were each subjected to sensitometry. These samples were then compared for sensitivity. The sensitivity is represented relative to the reciprocal of the exposure amount giving a density of fog +0.1 when Sample 101 is exposed to light through a minus blue filter as 100.

The difference in stain magenta density between Sample 100 as control and the test samples was determined to compare the test samples for color remaining (i.e., residual color).

The results are set forth in Table 1.

TABLE 1

| | Sensitizing dye added and results of sensitivity and color remaining | | | |
|---|---|---|---|---|
| Sample | Sensitizing dye | Sensitivity | Color remaining | Remarks |
| 100 | Not added | — | 0 (reference) | Control |
| 101 | S-2 | 100 (reference) | 0.56 | Comparative example |
| 102 | S-9 | 105 | 0.41 | Comparative example |
| 103 | III-7 | 127 | 0.25 | Present invention |

TABLE 1-continued

Sensitizing dye added and results of sensitivity and color remaining

| Sample | Sensitizing dye | Sensitivity | Color remaining | Remarks |
|---|---|---|---|---|
| 104 | III-8 | 136 | 0.23 | Present invention |
| 105 | S-10 | 85 | 0.32 | Comparative example |

As can be seen in the results of Table 1, the dye of the general formula (III) of the present invention provides a higher sensitivity and causes very little color remaining (i.e., very little residual color) than the comparative dyes. The use of this sensitizing dye makes it possible to obtain a silver halide photographic material which exhibits both high sensitivity and little residual color.

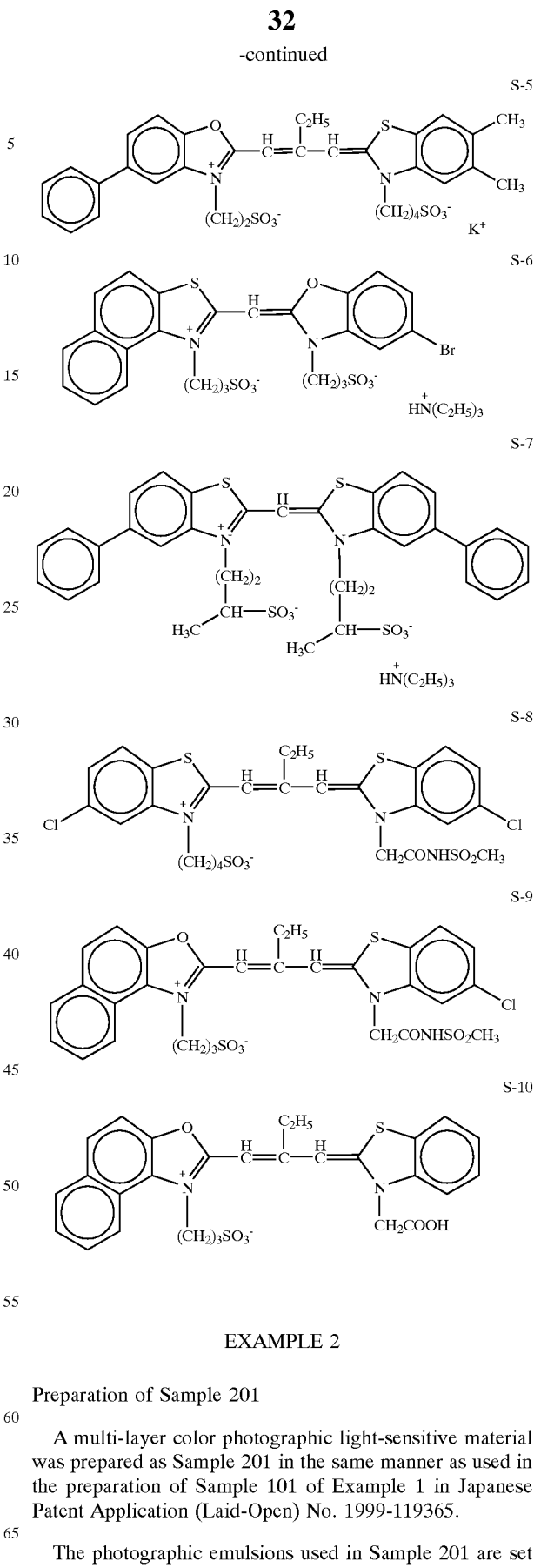

EXAMPLE 2

Preparation of Sample 201

A multi-layer color photographic light-sensitive material was prepared as Sample 201 in the same manner as used in the preparation of Sample 101 of Example 1 in Japanese Patent Application (Laid-Open) No. 1999-119365.

The photographic emulsions used in Sample 201 are set forth in Table 2 below.

TABLE 2

Silver halide particles in emulsion and sensitizing dye added

| Emulsion | Equivalent sphere diameter ($\mu$m) | Variation coefficient of equivalent sphere diameter (%) | Aspect ratio averaged over all particles | Iodine content (mole-%) | Sensitizing dye Kind | Sensitizing dye Added amount ($\times 10^{-4}$ mol/molAg) | Sensitizing dye Kind | Sensitizing dye Added amount ($\times 10^{-4}$ mol/molAg) | Sensitizing dye Kind | Sensitizing dye Added amount ($\times 10^{-4}$ mol/molAg) |
|---|---|---|---|---|---|---|---|---|---|---|
| A | 0.20 | 16 | 1.6 | 4.0 | s-1 | 8.1 | | | S-3 | 0.3 |
| B | 0.25 | 15 | 3.0 | 4.0 | s-1 | 8.9 | | | S-3 | 0.3 |
| C | 0.22 | 14 | 2.5 | 4.0 | s-1 | 8.8 | S-2 | 0.2 | S-3 | 0.2 |
| D | 0.35 | 10 | 3.6 | 4.0 | s-1 | 9.8 | S-2 | 0.3 | S-3 | 0.2 |
| E | 0.49 | 16 | 5.0 | 2.0 | s-1 | 6.7 | S-2 | 0.5 | S-3 | 0.2 |
| F | 0.15 | 15 | 1.0 | 3.5 | s-4 | 15.1 | S-5 | 1.5 | | |
| G | 0.23 | 14 | 1.9 | 3.5 | s-4 | 10.4 | S-5 | 2.0 | | |
| H | 0.32 | 11 | 2.4 | 3.5 | s-4 | 7.5 | S-5 | 1.4 | | |
| I | 0.28 | 11 | 4.5 | 3.3 | s-4 | 7.7 | S-5 | 1.4 | | |
| J | 0.40 | 16 | 4.0 | 3.3 | s-4 | 7.2 | S-5 | 1.4 | | |
| K | 0.59 | 20 | 5.9 | 2.8 | s-4 | 6.4 | S-5 | 1.2 | | |
| L | 0.24 | 14 | 3.4 | 4.6 | s-6 | 6.5 | S-7 | 2.5 | | |
| M | 0.30 | 10 | 3.0 | 4.6 | s-6 | 6.2 | S-7 | 2.0 | | |
| N | 0.40 | 9 | 4.5 | 1.6 | s-6 | 5.6 | S-7 | 1.8 | | |
| O | 0.60 | 15 | 5.5 | 1.0 | s-6 | 4.0 | S-7 | 1.5 | | |
| P | 0.80 | 18 | 2.5 | 1.0 | s-6 | 3.4 | S-7 | 1.1 | | |

Note 1) All the foregoing emulsions are silver bromoiodide emulsions chemically sensitized with gold, sulfur and selenium.

Note 2) All the foregoing emulsions have a sensitizing dye incorporated therein before chemical sensitization.

Note 3) The foregoing emulsions comprise Compounds F-5, F-7, F-8, F-9, F-10, F-11, F-12, F-13 and F-14 disclosed in Japanese Patent Application (Laid-Open) No. 1999-119365 properly incorporated therein.

Note 4) Emulsions A, B, I and J each comprise triple-structured tabular grains having (100) plane as a main plane, and the other emulsions each comprise triple-structured tabular grains having (111) plane as a main plane.

Note 5) Emulsions A, B, E, F, I and P each are an emulsion having a higher sensitivity in the interior thereof than on the surface thereof.

Note 6) Emulsions I and P each comprise grains obtained by the epitaxial growth of chemically-sensitized silver chloride.

Note 7) The emulsions other than Emulsions A, E and F each comprise grains which exhibit 50 or more dislocations per grain as observed under transmission electron microscope.

Preparation and Evaluation of Samples 200, and 202 to 211

Samples 202 to 211 were prepared in the same manner as in Sample 201 except that the sensitizing dyes S-1 and S-2 in Emulsions A to E were replaced by the dyes set forth in Table 3 below, respectively, in equimolecular amount (other dyes were not replaced). Further, Sample 200 was prepared as a control in the same manner as in Sample 201 except that no dyes were added.

The samples thus obtained were each exposed to white light through a gray wedge at an exposure amount of 20 CMS for 1/100 second, processed according to the following processing steps, and then subjected to sensitometry. The cyan stain density of control Sample 200 was subtracted from that of the samples thus processed to evaluate color remaining (i.e., residual color). The stain density was measured by means of a densitometer produced by X-RITE CO. LTD. (Status A).

The various samples were each exposed to light from a halogen lamp having a color temperature of 3,200° K as a light source through a pattern for measurement of RMS value, subjected to the following processing steps, and then measured for RMS value by means of a microdensitometer (measuring aperture: 48 $\mu$m).

(Processing)

| Processing step | Time | Temp. | Capacity of tank | Replenishment rate |
|---|---|---|---|---|
| 1st development | 6 min. | 38° C. | 12 l | 2,200 ml/m$^2$ |
| 1st water washing | 2 min. | 38° C. | 4 l | 7,500 ml/m$^2$ |
| Reversal | 2 min. | 38° C. | 4 l | 1,100 ml/m$^2$ |
| Color development | 6 min. | 38° C. | 12 l | 2,200 ml/m$^2$ |
| Prebleach | 2 min. | 38° C. | 4 l | 1,100 ml/m$^2$ |
| Bleach | 6 min. | 38° C. | 2 l | 220 ml/m$^2$ |
| Fixing | 4 min. | 38° C. | 8 l | 1,100 ml/m$^2$ |
| 2nd water washing | 1 min. | 25° C. | 8 l | 7,500 ml/m$^2$ |
| Final rinse | 1 min. | 25° C. | 2 l | 1,100 ml/m$^2$ |

The formulation of the various processing solutions are the same as that of the processing solutions used in Example 1 of Japanese Patent Application (Laid-Open) No. 1999-119365. For the evaluation of color remaining (i.e., residual color) the temperature of the 2nd water washing step was lowered and the time of the 2nd water washing was reduced.

The results of evaluation of sensitometry, color remaining and graininess are set forth in Table 3 below. The relative red sensitivity was compared relative to the relative exposure amount giving a density of lowest density plus 1.0 (relative to the sensitivity of Sample 202 as 100). RMS value is defined by the value with respect to cyan density of 0.7 relative to that of Sample 202 as 100 (The smaller this value is, the better is graininess).

TABLE 3

Results of red sensitivity, cyan color remaining and graininess

| Coated sample No. | Sensitizing dye | | Red sensitivity | Cyan color remaining | RMS value (graini-ness) | Remarks |
|---|---|---|---|---|---|---|
| 200 | None | None | — | 0 (reference) | — | Control |
| 201 | S-1 | S-2 | 105 | 0.133 | 88 | Comparative |
| 202 | S-1 | S-1 | 100 (reference) | 0.085 | 100 (reference) | Comparative |
| 203 | S-8 | S-8 | 106 | 0.055 | 105 | Comparative |
| 204 | IV-7 | IV-7 | 103 | 0.027 | 113 | Comparative |
| 205 | III-8 | III-8 | 115 | 0.075 | 99 | Present invention |
| 206 | IV-7 | S-9 | 117 | 0.085 | 89 | Comparative |
| 207 | S-1 | III-8 | 124 | 0.063 | 85 | Present invention |
| 208 | IV-7 | III-8 | 185 | 0.035 | 68 | Present invention |

TABLE 3-continued

Results of red sensitivity, cyan color remaining and graininess

| Coated sample No. | Sensitizing dye | | Red sensitivity | Cyan color remaining | RMS value (graini-ness) | Remarks |
|---|---|---|---|---|---|---|
| 209 | IV-7 | III-7 | 170 | 0.039 | 63 | Present invention |
| 210 | IV-8 | III-8 | 178 | 0.041 | 70 | Present invention |
| 211 | IV-9 | III-8 | 183 | 0.029 | 72 | Present invention |

As can be seen in the results of Table 3 above, the cyanine dye of the general formula (III) of the present invention provides a higher sensitivity and causes less color remaining than the comparative dyes regardless of which it is used singly or in combination with dyes falling outside the present invention.

It can also be confirmed that the use of the cyanine dye of the general formula (III) of the present invention in combination with the cyanine dye of the general formula (IV) provides remarkable enhancement of sensitivity and graininess and remarkable inhibition of color remaining.

Thus, it was found that an emulsion which uniquely accomplishes both high sensitivity and little color remaining without deteriorating graininess can be obtained only when two methine dyes of the general formula (I) of the present invention are used in combination.

EXAMPLE 3

Preparation of Sample 301

A multi-layer color photographic light-sensitive material was prepared as Sample 301 in the same manner as used in Sample 101 of Example 1 in Japanese Patent Application (Laid-Open) No. 1999-305396.

AgI content, grain size, surface iodine content, etc. of the emulsions used are set forth in Table 4 below.

TABLE 4

Emulsions used

| Emulsion | Average iodine content (mol-%) | Variation coefficient of inter-grain distribution (%) | Average grain diameter (equivalent sphere diameter: μm) | Variation coefficient of equivalent sphere diameter (%) | Projected diameter (equivalent circle diameter: μm) | Diameter/thickness ratio | Surface iodine content (mol-%) | Grain shape |
|---|---|---|---|---|---|---|---|---|
| A | 3.9 | 20 | 0.37 | 19 | 0.40 | 2.7 | 2.3 | Tabular |
| B | 5.1 | 17 | 0.52 | 21 | 0.67 | 5.2 | 3.5 | Tabular |
| C | 7.0 | 18 | 0.86 | 22 | 1.27 | 5.9 | 5.2 | Tabular |
| D | 4.2 | 17 | 1.00 | 18 | 1.53 | 6.5 | 2.8 | Tabular |
| E | 7.2 | 22 | 0.87 | 22 | 1.27 | 5.7 | 5.3 | Tabular |
| F | 2.6 | 18 | 0.28 | 19 | 0.28 | 1.3 | 1.7 | Tabular |
| G | 4.0 | 17 | 0.43 | 19 | 0.58 | 3.3 | 2.3 | Tabular |
| H | 5.3 | 18 | 0.52 | 17 | 0.79 | 6.5 | 4.7 | Tabular |
| I | 5.5 | 16 | 0.73 | 15 | 1.03 | 5.5 | 3.1 | Tabular |
| J | 7.2 | 19 | 0.93 | 18 | 1.45 | 5.5 | 5.4 | Tabular |
| K | 1.7 | 18 | 0.40 | 16 | 0.52 | 6.0 | 2.1 | Tabular |
| L | 8.7 | 22 | 0.64 | 18 | 0.86 | 6.3 | 5.8 | Tabular |
| M | 7.0 | 20 | 0.51 | 19 | 0.82 | 5.0 | 4.9 | Tabular |
| N | 6.5 | 22 | 1.07 | 24 | 1.52 | 7.3 | 3.2 | Tabular |
| O | 1.0 | — | 0.07 | — | 0.07 | 1.0 | — | Uniform |
| P | 0.9 | — | 0.07 | — | 0.07 | 1.0 | — | Uniform |

In Table 4 Above,
(1) Emulsions L to O were each subjected to reduction sensitization with thiourea dioxide and thiosulfonic acid during the preparation of grains according to the examples in Japanese Patent Application (Laid-Open) No. 1990-191938;
(2) Emulsions A to O were each subjected to gold sensitization, sulfur sensitization and selenium sensitization on the various light-sensitive layers with the spectral sensitizing dyes and sodium thiocyanate according to the examples in Japanese Patent Application (Laid-Open) No. 1991-237450;
(3) Low molecular gelatins were used in the preparation of tabular grains according to the examples in Japanese Patent Application (Laid-Open) No. 1989-158426; and
(4) Tabular grains were observed to exhibit dislocation lines as described in Japanese Patent Application (Laid-Open) No. 1991-237450 under high voltage electron microscope.

Preparation of Samples 302 to 304

Samples 302 to 304 were prepared in the same manner as in Sample 301 except that the sensitizing dyes ExS-9 and ExS-10 in the 13th layer and 14th layer were replaced by the sensitizing dyes set forth in Table 4 below, respectively.

Preparation of Samples 305 to 308

Samples 305 to 308 were prepared by preparing coating solutions for the 13th layer and 14th layer used in Samples 301 to 304, aging the coating solutions with stirring for 12 hours, and then applying the coating solutions to a support.

These samples were each evaluated for sensitivity, fog and effect of dissolution of emulsion according to the following methods.

The samples were each subjected to sensitometry exposure to light from a light source having a color temperature of 4,800° K through a continuous wedge and a gelatin filter SC-50 (produced by Fuji Photo Film Co., Ltd.) for 1/100 second, and then subjected to the following color development.

| (Processing) | | |
|---|---|---|
| Step | Processing time | Processing temperature |
| Color development | 3 min. 15 sec. | 38° C. |
| Bleaching | 3 min. 00 sec. | 38° C. |
| Water washing | 30 sec. | 24° C. |
| Fixing | 3 min. 00 sec. | 38° C. |
| Water washing (1) | 30 sec. | 24° C. |
| Water washing (2) | 30 sec. | 24° C. |
| Stabilizing | 30 sec. | 38° C. |
| Drying | 4 min. 20 sec. | 55° C. |

The formulation of the various processing solutions are the same as that of the processing solutions used in Example 1 of Japanese Patent Application (Laid-Open) No. 1999-305396.

Samples 301 to 308 thus developed were each then measured for yellow density.

The sensitivity is defined by the reciprocal of the exposure amount required to give an optical density of fog plus 0.2 relative to that of Sample 301 as 100. Fog is formed by color development of coupler at the unexposed area and color remaining of sensitizing dyes. The results are set forth in Table 5 below.

TABLE 5

Results of green sensitivity and color remaining

| Sample | Dyes in 13th and 14th layers (added amount: $\times 10^{-4}$ mol/mol Ag) | | Blue sensitivity (relative value) | Yellow fog | Remarks |
|---|---|---|---|---|---|
| 301 | ExS-9 | ExS-10 | 100 | 0.095 | Comparative |
| 305 (aged in solution form) | (4.4, 3.6) | (4.0, 0) | 81 | 0.129 | Example |
| 302 | ExS-9 | III-1 | 124 | 0.059 | Present |
| 306 (aged in solution form) | (4.4, 3.6) | (4.0, 0) | 105 | 0.078 | invention |
| 303 | IV-2 | ExS-10 | 107 | 0.073 | Comparative |
| 307 (aged in solution form) | (4.4, 3.6) | (4.0, 0) | 91 | 0.095 | Example |
| 304 | IV-2 | III-1 | 150 | 0.042 | Present |
| 308 (aged in solution form) | (4.4, 3.6) | (4.0, 0) | 146 | 0.048 | invention |

As can be seen in the results of Table 5 above, the use of the methine dye represented by the general formula (III) of the present invention makes it possible to obtain a silver halide photographic material which exhibits a high sensitivity and little color remaining. Further, when the methine dye of the general formula (III) of the present invention is used in combination with the methine dye of the general formula (IV), a silver halide photographic material which exhibits a high sensitivity and extremely little color remaining can be obtained. Even after aged in the form of solution, the methine dye of the general formula (III) still exhibits a high sensitivity and causes little fog. This is presumably attributed to inhibition of coalescence of silver halide grains.

Thus, it was found that a silver halide photographic material which uniquely exhibits a high sensitivity, and little color remaining and is subject to little sensitivity drop and minimized generation of fog even if the emulsion is aged in the form of solution.

EXAMPLE 4

Preparation of Emulsion of Octahedral Silver Bromide Grains (Emulsion A) and Emulsions of Tabular Silver Bromide Grains (Emulsions B and C)

In a reaction vessel were charged 1,000 ml of water, 25 g of a deionized ossein gelatin, 15 ml of a 50% aqueous solution of $NH_4NO_3$ and 7.5 ml of a 25% aqueous solution of $NH_3$ which were then thoroughly stirred at a temperature of 50° C. To the contents of the reaction vessel were then added 750 ml of a 1N aqueous solution of $AgNO_3$ and a 1 mol/l aqueous solution of KBr in 50 minutes so that the silver potential was kept to −40 mV during reaction. The silver bromide grains thus obtained were octahedral grains having an equivalent sphere diameter of 0.846±0.036 μm. The temperature of the foregoing emulsion was lowered. To the emulsion was then added a copolymer of isobutene and monosodium maleate as a flocculant. The resulting precipitate was washed with water to effect desalting. Subsequently, to the desalted emulsion were added 95 g of a deionized ossein gelatin and 430 ml of water so that the pH value and pAg value thereof were adjusted to 6.5 and 8.3, respectively. The emulsion was then ripened at a temperature of 55° C. with potassium thiocyanate, chloroauric acid and sodium thiosulfate for 50 minutes to have an optimum sensitivity. The emulsion was referred to as "Emulsion A".

In 1.2 l of water were then dissolved 6.4 g of KBr and 6.2 g of a low molecular gelatin having an average molecular weight of not greater than 15,000. To the solution were then added 8.1 ml of a 16.4% aqueous solution of $AgNO_3$ and 7.2 ml of a 23.5% aqueous solution of KBr by a double jet method in 10 seconds while the temperature thereof was being kept at 30° C. Subsequently, to the emulsion was added a 11.7% aqueous solution of gelatin. The emulsion was heated to a temperature of 75° C. where it was then ripened for 40 minutes. To the emulsion were then added 370 ml of a 32.2% aqueous solution of $AgNO_3$ and a 20% aqueous solution of KBr in 10 minutes while the silver potential thereof was being kept to −20 mV. The emulsion was then subjected to physical ripening for 1 minutes. The temperature of the emulsion was then lowered to 35° C. Thus, a monodisperse emulsion of pure tabular silver bromide grains having an average projected diameter of 2.32 μm, a thickness of 0.09 μm and a diameter variation coefficient of 15.1% (specific gravity: 1.15). Thereafter, the emulsion was subjected to coalesnce and precipitation to remove soluble salts therefrom. To the emulsion were then added 45.6 g of gelatin, 10 ml of a 1 mol/l aqueous solution of sodium hydroxide, 167 ml of water and 1.66 ml of 35% phenoxyethanol while the temperature thereof was being kept at 40° C. so that the pAg and pH value thereof were adjusted to 8.3 and 6.20, respectively.

The emulsion was then ripened at a temperature of 55° C. with potassium thiocyanate, chloroauric acid and sodium thiosulfate for 50 minutes to have an optimum sensitivity. The emulsion was referred to as "Emulsion B".

An emulsion was prepared as Emulsion C in the same manner as described above except that the chemical sensitization was effected with potassium thiocyanate, chloroauric acid, pentafluorophenyl-diphenylphosphine selenide and sodium thiosulfate instead of potassium thiocyanate, chloroauric acid and sodium thiosulfate.

These emulsions were each stirred with the dyes set forth in Table 6 below while being kept at a temperature of 50° C. for 30 minutes, and then stirred at a temperature of 60° C. for 60 minutes.

To the emulsions were each added a gelatin hardener and a coating aid. These emulsions were each then applied to a cellulose acetate film in a coated amount of 3.0 g Ag/m$^2$ at the same time with a gelatin protective layer to obtain Samples 401 to 409. The films thus obtained were each then exposed to light from a tungsten lamp (color temperature: 2,854° K) through a continuous wedge color filter for 1 second. Using a minus blue exposure Fuji gelatin filter SC-46 (produced by Fuji Photo Film Co., Ltd.) for exciting dyes as a color filter, light having a wavelength of 460 nm or less was cut off from the light with which the samples were then irradiated. The samples thus exposed were each then developed with the following surface developer MAA-1 at a temperature of 20° C. for 10 minutes. The samples were each fixed according to the following fixing step, washed with water, and then dried.

| Surface developer MAA-1 | |
| --- | --- |
| Metol | 2.5 g |
| L-ascorbic acid | 10 g |
| Nabox (produced by Fuji Photo Film Co., Ltd.) | 35 g |
| Potassium bromide | 1 g |
| Water to make | 1 liter |
| pH | 9.8 |

| Formulation of fixing solution | |
| --- | --- |
| Ammonium thiosulfate | 170 g |
| Sodium sulfite (anhydrous) | 15 g |
| Boric acid | 7 g |
| Glacial acetic acid | 15 ml |
| Potassium alum | 20 g |
| Ethylenediaminetetraacetic acid | 0.1 g |
| Tartaric acid | 3.5 g |
| Water to make | 1 liter |

The films thus developed and otherwise processed were each then measured for optical density using an automatic densitometer produced by Fuji Photo Film Co., Ltd. The sensitivity is defined by the reciprocal of the dosage (i.e., the light amount) required to give an optical density of fog plus 0.2 relative to that of Sample 401 as 100.

The results are set forth in Table 6 below.

TABLE 6

Comparison of grain shapes and effect of selenium sensitization

| Sample | Emulsion (Grain shape/chemical sensitization) | Dye (added amount) | Sensitivity | Fog | Remarks |
| --- | --- | --- | --- | --- | --- |
| 401 | A (octahedral/sulfur sensitization) | IV-7 (5.0 × 10$^{-4}$ mol/mol Ag) | 100 | 0.03 | Comparative example |
| 402 | A | III-8 (5.0 × 10$^{-4}$ mol/mol Ag) | 107 | 0.09 | Present invention |
| 403 | A | IV-7 (3.0 × 10$^{-4}$ mol/mol Ag) III-8 (2.0 × 10$^{-4}$ mol/mol Ag) | 121 | 0.05 | Present invention |
| 404 | B (tabular/sulfur sensitization) | IV-7 (8.0 × 10$^{-4}$ mol/mol Ag) | 135 | 0.07 | Comparative example |
| 405 | B | III-8 (8.0 × 10$^{-4}$ mol/mol Ag) | 149 | 0.15 | Present invention |
| 406 | B | IV-7 (4.8 × 10$^{-4}$ mol/mol Ag) III-8 (3.2 × 10$^{-4}$ mol/mol Ag) | 185 | 0.09 | Present invention |
| 407 | C (tabular/selenium sensitization) | IV-7 (8.0 × 10$^{-4}$ mol/mol Ag) | 159 | 0.09 | Comparative example |
| 408 | C | III-8 (8.0 × 10$^{-4}$ mol/mol Ag) | 178 | 0.19 | Present invention |
| 409 | C | IV-7 (4.8 × 10$^{-4}$ mol/mol Ag) III-8 (3.2 × 10$^{-4}$ mol/mol Ag) | 213 | 0.12 | Present invention |

As can be seen in Table 6 above, the silver halide photographic material comprising the methine dye represented by the general formula (III) of the present invention exhibits a high sensitivity. Further, the silver halide photographic material comprising the methine dye represented by the general formula (III) in combination with the methine dye represented by the general formula (IV) exhibits an extremely high sensitivity and shows little fog (little color remaining). This tendency become more remarkable with tabular grain than with octahedral grain and with selenium-sensitized emulsion than with sulfur-sensitized emulsion. Sample 409 realizes a remarkably high sensitivity and little color remaining.

It was thus found that an emulsion which uniquely exhibits a high sensitivity and causes little color remaining was obtained only when two methine dyes represented by the general formula (I) of the present invention are used in combination and this effect becomes remarkable with the combination with an emulsion of tabular grains or with selenium sensitization.

EXAMPLE 5

Emulsions 1 to 4 were prepared according to the following method.

(1) Preparation of Emulsion 1

To an aqueous solution of a gelatin having an average molecular weight of 15,000 (containing 1,200 ml of water, 7.0 g of gelatin and 4.5 g of KBr) were added a 1.9 M $AgNO_3$ aqueous solution a 1.9 M MBr aqueous solution with stirring at a rate of 25 ml/min by a double jet method for 70 seconds to obtain a tabular nucleus. To 400 ml of the emulsion thus obtained as a crystal seed was then added 650 ml of an inert gelatin aqueous solution (containing 20 g of gelatin and 1.2 g of KBr). The emulsion was heated to a temperature of 75° C. where it was then ripened for 40 minutes. To the emulsion was then added an aqueous solution of $AgNO_3$ (containing 1.7 g of $AgNO_3$) in 1 minute and 30 seconds. Subsequently, the emulsion was ripened with 7.0 ml of a 50 wt-% aqueous solution of $NH_4NO_3$ and 7.0 ml of a 25 wt-% aqueous solution of $NH_3$ for 40 minutes.

Subsequently, the emulsion was adjusted with 3 N $HNO_3$ to pH7. To the emulsion was then added 1.0 g of KBr. To the emulsion were then added 366.5 ml of a 1.9 M aqueous solution of $AgNO_3$ and an aqueous solution of KBr. Subsequently, to the emulsion were added 53.6 ml of a 1.9 M aqueous solution of $AgNO_3$ and an aqueous solution of KBr (containing 33.3 mol-% of KI). Further, to the emulsion were added 160.5 ml of a 1.9 M aqueous solution of $AgNO_3$ and an aqueous solution of KBr while the pAg value thereof was being kept to 7.9. Thus, Emulsion 1 was obtained.

Emulsion 1 thus obtained comprised triple structure grains having a highest silver iodide content region in the middle shell thereof. The average aspect ratio of Emulsion 1 was 2.8. The proportion of tabular grains having an aspect ratio of not smaller than 3 in the total projected area was 26%. The coefficient of variation of grain size was 7%. The average grain size was 0.98 μm as an equivalent sphere diameter.

Emulsion 1 was desalted by an ordinary flocculation method, and then subjected to optimum gold-sulfur-selenium sensitization in the presence of the sensitizing dye set forth in Table 8 below.

(2) Preparation of Emulsions 2 and 3

To an aqueous solution of a gelatin having an average molecular weight of 15,000 (containing 1,200 ml of water, 7.0 g of gelatin and 4.5 g of KBr) were added a 1.9 M $AgNO_3$ aqueous solution and a 1.9 M MBr aqueous solution with stirring at a rate of 25 ml/min by a double jet method for 70 seconds to obtain a tabular nucleus. To 350 ml of the emulsion thus obtained as a crystal seed was then added 650 ml of an inert gelatin aqueous solution (containing 20 g of gelatin and 1.2 g of KBr). The emulsion was heated to a temperature of 75° C. where it was then ripened for 40 minutes. To the emulsion was then added an aqueous solution of $AgNO_3$ (containing 1.7 g of $AgNO_3$) in 1 minute and 30 seconds. Subsequently, the emulsion was ripened with 6.2 ml of a 50 wt-% aqueous solution of $NH_4NO_3$ and 6.2 ml of a 25wt-% aqueous solution of $NH_3$ for 40 minutes. The emulsion thus obtained was hereinafter referred to as "Emulsion A". Emulsion A was then processed in the following two procedures to prepare Emulsions 2 and 3, respectively.

Firstly, Emulsion A was adjusted with 3 N $HNO_3$ to pH7. To the emulsion was then added 1.0 g of KBr. To the emulsion were then added 366.5 ml of a 1.9 M aqueous solution of $AgNO_3$ and an aqueous solution of KBr. Subsequently, to the emulsion were added 53.6 ml of a 1.9 M aqueous solution of $AgNO_3$ and an aqueous solution of KBr (containing 33.3 mol-% of KI). Further, to the emulsion were added 160.5 ml of a 1.9 M aqueous solution of $AgNO_3$ and an aqueous solution of KBr while the pAg value thereof was being kept to 8.3. Thus, Emulsion 2 was obtained.

Subsequently, Emulsion A was adjusted with 3 N $HNO_3$ to pH7. To the emulsion was then added 1.2g of KBr. To the emulsion were then added 366.5 ml of a 1.9 M aqueous solution of $AgNO_3$ and an aqueous solution of KBr. Subsequently, to the emulsion were added 53.6 ml of a 1.9 M aqueous solution of $AgNO_3$ and an aqueous solution of KBr (containing 33.3 mol-% of KI). Further, to the emulsion were added 160.5 ml of a 1.9 M aqueous solution of $AgNO_3$ and an aqueous solution of KBr while the pAg value thereof was being kept to 8.8. Thus, Emulsion 3 was obtained.

Emulsion 2 thus obtained comprised triple structure grains having a highest silver iodide content region in the middle shell thereof. The average aspect ratio of the grains in Emulsion 2 was 6.7. The proportion of tabular grains having an aspect ratio of not smaller than 6 in the total projected area was 80%. The proportion of tabular grains having an aspect ratio of from not smaller than 3 to not greater than 100 in the total projected area was 95%. The coefficient of variation of grain size was 11%. The average grain size was 1.0 μm as an equivalent sphere diameter.

Emulsion 3 thus obtained comprised triple structure grains having a highest silver iodide content region in the middle shell thereof. The average aspect ratio of the grains in Emulsion 3 was 8.8. The proportion of tabular grains having an aspect ratio of not smaller than 6 in the total projected area was 90%. The proportion of tabular grains having an aspect ratio of from not smaller than 3 to not greater than 100 in the total projected area was 97%. The coefficient of variation of grain size was 13%. The average grain size was 1.13 μm as an equivalent sphere diameter.

Emulsions 2 and 3 were each desalted by an ordinary flocculation method, and then subjected to optimum gold-sulfur-selenium sensitization in the presence of the sensitizing dye set forth in Table 8 below.

(3) Preparation of Emulsion 4

To 1.5 l of a 0.8% solution of a low molecular gelatin (molecular weight: 15,000) containing 0.05 mols of KBr were added 15 ml of a 0.5 M $AgNO_3$ solution and 15 ml of a 0.5 M KBr solution with stirring by a double jet method in 15 seconds. During this procedure, the gelatin solution was kept at a temperature of 40° C. At this point, the pH value of the gelatin solution was 5.0. Thereafter, the emulsion was heated to a temperature of 75° C. To the emulsion was then added 220 ml of a 10% trimellited gelatin (percent trimellitation: 95%). The emulsion was then ripened for 20 minutes. Thereafter, to the emulsion was added 80 ml of a 0.47 M solution of $AgNO_3$.

The emulsion was then ripened for 10 minutes. To the emulsion were then added 150 g of $AgNO_3$ and a solution of KBr containing KI in an amount such that pBr thereof was kept at 2.55 at an accelerated flow rate (flow rate at the end of addition was 19 times that at the beginning of addition) in 60 minutes while the potential thereof was being kept to 0 mV. Thereafter, to the emulsion was added 30ml of a 10% KI solution. Thereafter, to the emulsion was added a 1N NaOH to have a pH value of 7.2. To the emulsion were then added 327 ml of a 0.5 M $AgNO_3$ solution and 16.4 ml of a $10^{-2}$ M solution of yellow prussiate of potash. To the emulsion were then added 327 ml of a 0.5 M KBr solution in 20 minutes by a controlled double jet method while the potential thereof was being kept to 0 mV. After the formation of shell, the emulsion was cooled to a temperature of 35° C., and then rinsed by an ordinary flocculation method. To the emulsion were then added 80 g of a deionized alkali-treated ossein gelatin and 40 ml of a 2% Zn(NO$_3$)$_2$ at a temperature of 40° C. so that the pH value and pAg thereof were adjusted to 6.5 and 8.6, respectively. The emulsion thus obtained was then stored in a chilled and dark place.

The tabular grain had a diameter variation coefficient of 15% as calculated in terms of circle having the same area as the projected area (hereinafter referred to as "equivalent circle diameter"), an equivalent circle diameter of 2.5 μm and an average thickness of 0.10 μm (aspect ratio: 25). The tabular grain was formed by silver bromoiodide having a silver iodide content of 5.7 mol-%.

Emulsion 4 was desalted by an ordinary flocculation method, and then subjected to optimum gold-sulfur-selenium sensitization in the presence of the sensitizing dye set forth in Table 8 below.

(4) Preparation of Coated Samples

The emulsion layers and protective layers set forth in Table 7 were each applied to a triacetyl cellulose film support having thereon an undercoating layer to prepare Samples 501 to 508.

TABLE 7

| Conditions of coating of emulsion | |
|---|---|
| (1) Emulsion layer Emulsions 1–4 (For dyes used, see Table 8) | 2.1 × 10$^{-3}$ mol/m$^2$ (silver) |
| Coupler shown below | 1.5 × 10$^{-3}$ mol/m$^2$ (silver) |
| (2) Protective layer Gelatin | 1.80 g/m$^2$ |
| 2,4-Dichloro-6-hydroxy-s-triazine sodium salt | 0.08 g/m$^2$ |

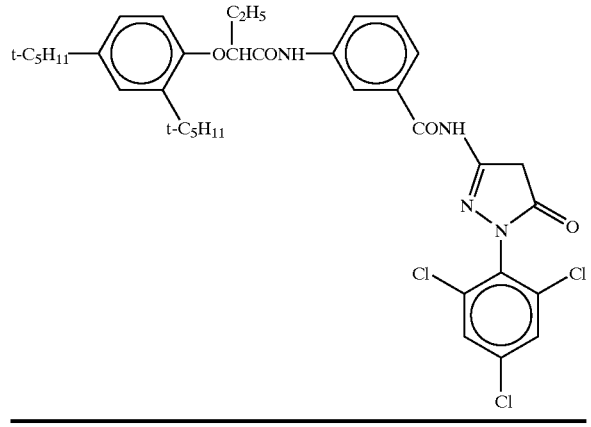

These samples were each subjected to sensitometry exposure (1/100 sec), and then subjected to color development as follows.

Processing method

| Step | Processing time | Processing temp. | Replenishment rate | Tank capacity |
|---|---|---|---|---|
| Color development | 2 min. 45 sec. | 38° C. | 33 ml | 20 l |
| Bleach | 6 min. 30 sec. | 38° C. | 25 ml | 40 l |
| Water washing | 2 min. 10 sec. | 24° C. | 1,200 ml | 20 l |
| Fixing | 4 min. 20 sec. | 38° C. | 25 ml | 30 l |

-continued

Processing method

| Step | Processing time | Processing temp. | Replenishment rate | Tank capacity |
|---|---|---|---|---|
| Water washing (1) | 1 min. 05 sec. | 24° C. | Countercurrent from (2) to (1) | 10 l |
| Water washing (2) | 1 min. 00 sec. | 24° C. | 1,200 ml | 10 l |
| Stabilizing | 1 min. 05 sec. | 38° C. | 25 ml | 10 l |
| Drying | 4 min. 20 sec. | 55° C. | | |

(Replenishment rate: per 35 mm width and 1 m length)

The formulation of the processing solution will be given below.

(Color developer)

| | Tank solution (g) | Replenisher (g) |
|---|---|---|
| Diethylenetriamine-pentaacetic acid | 1.0 | 1.1 |
| 1-Hydroxyethylidene-1,1-diphosphonic acid | 3.0 | 3.2 |
| Sodium sulfite | 4.0 | 4.4 |
| Potassium carbonate | 30.0 | 37.0 |
| Potassium bromide | 1.4 | 0.7 |
| Potassium iodide | 1.5 mg | — |
| Hydroxylamine sulfate | 2.4 | 2.8 |
| 4-[N-ethyl-N-β-hydroxyethyl-amino]-2-methylaniline sulfate | 4.5 | 5.5 |
| Water to make | 1.0 l | 1.0 l |
| pH | 10.05 | 10.05 |

(Bleaching solution)

| | Tank solution (g) | Replenisher (g) |
|---|---|---|
| Ferric sodium ethylenediamine-tetraacetate trihydrate | 100.0 | 120.0 |
| Disodium ethylenediamine-tetraacetate | 10.0 | 11.0 |
| Ammonium bromide | 140.0 | 160.0 |
| Ammonium nitrate | 30.0 | 35.0 |
| 27% Aqueous ammonia | 6.5 ml | 4.0 ml |
| Water to make | 1.0 l | 1.0 l |
| pH | 6.0 | 5.7 |

(Fixing solution)

| | Tank solution (g) | Replenisher (g) |
|---|---|---|
| Sodium ethylenediamine-tetraacetate | 0.5 | 0.7 |
| Sodium sulfite | 7.0 | 8.0 |
| Sodium bisulfite | 5.0 | 5.5 |
| 70% Aqueous solution of ammonium thiosulfate | 170.0 ml | 200.0 ml |
| Water to make | 1.0 l | 1.0 l |
| pH | 6.7 | 6.6 |

(Stabilizer)

| | Tank solution (g) | Replenisher (g) |
|---|---|---|
| 37% Formalin | 2.0 ml | 3.0 ml |
| Polyoxyethylene-p-monononyl phenyl ether (average polymerization degree: 10) | 0.3 | 0.45 |
| Disodium ethylenediamine-tetraacetate | 0.05 | 0.08 |
| Water to make | 1.0 l | 1.0 l |
| pH | 5.8–8.0 | 5.8–8.0 |

The samples thus processed were each then measured for magenta density to evaluate the sensitivity thereof.

The sensitivity is defined by the reciprocal of the exposure amount giving an optical density of fog density plus 0.2. The sensitivity of the various samples were each represented relative to that of Sample 501 as 100.

The emulsions and sensitizing dyes used in the various samples and the results of sensitivity of the various samples are set forth in Table 8 below.

TABLE 8

Effect of aspect ratio of tabular grains

| Sample | Emulsion (average aspect ratio) | Dye (added amount: ×10$^{-4}$ mol/mol Ag) | | Sensitivity | Remarks |
|---|---|---|---|---|---|
| 501 | 1 (2.8) | IV-9 (3.1) | S-2 (0.98) | 100 | Comparative |
| 502 | 1 (2.8) | IV-9 (3.1) | III-8 (0.98) | 130 | Present invention |
| 503 | 2 (6.7) | IV-9 (4.1) | S-2 (1.3) | 115 | Comparative |
| 504 | 2 (6.7) | IV-9 (4.1) | III-8 (1.3) | 155 | Present invention |
| 505 | 3 (8.8) | IV-9 (5.3) | S-2 (1.7) | 126 | Comparative |
| 506 | 3 (8.8) | IV-9 (5.3) | III-8 (1.7) | 193 | Present invention |
| 507 | 4 (25) | IV-9 (7.1) | S-2 (2.2) | 132 | Comparative |
| 508 | 4 (25) | IV-9 (7.1) | III-8 (2.2) | 205 | Present invention |

As can be seen in Table 8 above, the combined use of the methine dye represented by the general formula (III) of the present invention and the methine dye represented by the general formula (IV) makes it possible to provide a remarkable improvement of sensitivity over the comparative emulsions. Further, the greater the aspect ratio of emulsion, the higher is the sensitivity of emulsion. In particular, the emulsions of the present invention comprising tabular grains having an aspect ratio of not smaller than 8 exhibit a remarkably enhanced sensitivity.

It was thus found that an emulsion which uniquely exhibits a high sensitivity can be obtained only when two methine dyes represented by the general formula (I) of the present invention are used in combination and this effect becomes remarkable when these dyes are used in combination with tabular grains having a high aspect ratio, particularly tabular grains having an aspect ratio of not smaller than 8.

EFFECT OF THE INVENTION

In accordance with the constitution of the present invention, a silver halide photographic material can be obtained which exhibits a high aging stability of emulsion in the form of solution, a high sensitivity and an excellent graininess and little color remaining (i.e., little residual color) even after rapid processing.

The entitle disclosure of each and every foreign patent application from which the benefit of foreign priority has been claimed in the present application is incorporated herein by reference, as if fully set forth herein.

While the invention has been described in detail and with reference to specific embodiments thereof, it will be apparent to one skilled in the art that various changes and modifications can be made therein without departing from the spirit and scope thereof.

What is claimed is:

1. A silver halide photographic material comprising at least one silver halide emulsion layer provided on a support, said emulsion layer comprising a silver halide emulsion containing at least two different sensitizing dyes, wherein one of the two different sensitizing dyes is represented by the following general formula (IV) and the other dye is represented by the following general formula (II):

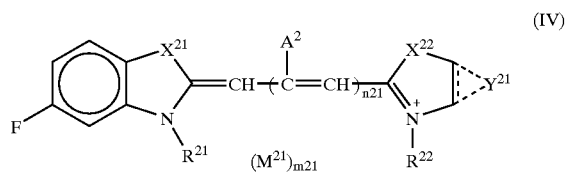

(IV)

wherein $R^{21}$ and $R^{22}$ each represent a substituted or unsubstituted alkyl group, with the proviso that at least one of $R^{21}$ and $R^{22}$ is substituted by a dissociative group other than —$SO_3H$ group;

$X^{21}$ and $X^{22}$ each represent an oxygen atom or sulfur atom;

$Y^{21}$ represents a condensed benzene ring which may have substituents, wherein the substituents on the substituted benzene ring in $Y^{21}$ are not connected to each other to form a condensed ring;

$A^2$ represents a hydrogen atom or unsubstituted alkyl group;

$n^{21}$ represents 0 or 1;

$M^{21}$ represents a counter ion; and $m^{21}$ represents a number of not smaller than 0 required to neutralize the electric charge in the molecule;

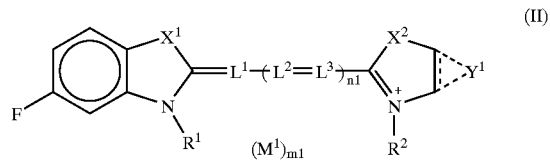

(II)

wherein $X^1$ and $X^2$ each represent an oxygen atom, sulfur atom, selenium atom or $NR^3$;

$R^1$, $R^2$ and $R^3$ each represent a substituted or unsubstituted alkyl, aryl or heterocyclic group;

$Y^1$ represents a condensed ring which may have substituents;

$L^1$, $L^2$ and $L^3$ each represent a methine group;

$n^1$ represents 0, 1, 2 or 3, with the proviso that when $n^1$ is 2 or 3, the plurality of $L^2$'s and $L^3$'s each may be the same or different;

$M^1$ represents a counter ion; and $m^1$ represents a number of not smaller than 0 required to neutralize the electric charge in the molecule.

2. The silver halide photographic material as in claim 1, wherein $n^1$ in formula (II) is equal to $n^{21}$ in formula (IV).

3. The silver halide photographic material as in claim 1, wherein said two sensitizing dyes each have at least two dissociative groups.

4. The silver halide photographic material as in claim 3, wherein said sensitizing dyes each have at least one —$SO_3H$ group and at least one dissociative group other than —$SO_3H$.

5. The silver halide photographic material as in claim 1, wherein the sensitizing dye of the general formula (II) is represented by the following general formula (III):

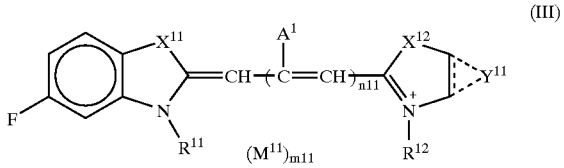

(III)

wherein
$R^{11}$ and $R^{12}$ each represent a substituted or unsubstituted alkyl group, with the proviso that at least one of $R^{11}$ and $R^{12}$ is substituted by a dissociative group other than —$SO_3H$ group;

$X^{11}$ and $X^{12}$ each represent an oxygen atom or sulfur atom;

$Y^{11}$ represents a condensed naphthalene ring which may have substituents;

$A^1$ represents a hydrogen atom or unsubstituted alkyl group;

$n^{11}$ represents 0 or 1;

$M^{11}$ represents a counter ion; and $m^{11}$ represents a number of not smaller than 0 required to neutralize the electric charge in the molecule.

6. The silver halide photographic material as in claim 5, wherein in formula (III) at least one of $R^{11}$ and $R^{12}$ is an alkyl group substituted by a —COOH group.

7. The silver halide photographic material as in claim 1, wherein the emulsion comprises tabular grains having an aspect ratio of not smaller than 2 incorporated therein in a proportion of not smaller than 50% based on the total projected area of the silver halide grains incorporated therein.

8. The silver halide photographic material as in claim 1, wherein $X^1$ and $X^2$ each are selected from the group consisting of oxygen atom and sulfur atom.

9. The silver halide photographic material as in claim 1, wherein the dissociative group other than —$SO_3H$ is selected from the group consisting of —COOH, —$CONHSO_2Z$, —$SO_2NHCOZ$, —$SO_2NHSO_2Z$ and —CONHCOZ in which Z represents an alkyl group, aryl group, heterocyclic group, alkoxy group, aryloxy group, heterocyclyloxy group or amino group.

10. The silver halide photographic material as in claim 1, wherein the emulsion is subjected to chemical sensitization with a selenium sensitizer.

* * * * *